United States Patent
Chang

(10) Patent No.: US 9,817,833 B2
(45) Date of Patent: Nov. 14, 2017

(54) SYSTEM AND METHOD FOR PROCESSING AN ELECTRONIC IMAGE FILE

(71) Applicants: Canon Information and Imaging Solutions, Inc., Melville, NY (US); Canon U.S.A., Inc, Melville, NY (US)

(72) Inventor: Tao Chang, Valley Stream, NY (US)

(73) Assignees: CANON INFORMATION AND IMAGING SOLUTIONS, INC., Melville, NY (US); CANON U.S.A., INC., Melville, NY (US)

( * ) Notice: Subject to any disclaimer, the term of this patent is extended or adjusted under 35 U.S.C. 154(b) by 304 days.

(21) Appl. No.: 14/588,145

(22) Filed: Dec. 31, 2014

(65) Prior Publication Data
US 2016/0188647 A1 Jun. 30, 2016

(51) Int. Cl.
G06F 17/30 (2006.01)
H04L 29/08 (2006.01)

(52) U.S. Cl.
CPC .... G06F 17/30082 (2013.01); G06F 17/3028 (2013.01); G06F 17/30292 (2013.01); H04L 67/06 (2013.01)

(58) Field of Classification Search
USPC .................................................. 707/802–805
See application file for complete search history.

(56) References Cited

U.S. PATENT DOCUMENTS

| 8,375,029 B2* | 2/2013 | Cui | G06F 17/30557 707/718 |
| 2006/0092097 A1 | 5/2006 | Reddy | |
| 2006/0248165 A1* | 11/2006 | Sridhar | H04L 41/5003 709/218 |
| 2007/0133882 A1 | 6/2007 | Matsuno | |
| 2007/0203874 A1* | 8/2007 | Cave | G06F 17/30067 |
| 2009/0052804 A1 | 2/2009 | Lewis | |
| 2010/0070500 A1* | 3/2010 | Cui | G06F 17/30914 707/736 |
| 2010/0281152 A1* | 11/2010 | Istavan | H04N 21/2355 709/223 |
| 2016/0004713 A1 | 1/2016 | Miyamoto et al. | |

OTHER PUBLICATIONS http://www.ricoh-usa.com/services_and_solutions/solutions/globalscan_nx_750/brochures/Ricoh_GS_NX_Svr532750.pdf.
http://www.skyjuicesoftware.com/software/QuickFileRename/pictures-photos-metadata-rename-file-rename.html.

* cited by examiner

*Primary Examiner* — Hanh Thai
(74) *Attorney, Agent, or Firm* — Canon USA Inc., IP Division

(57) ABSTRACT

A method and system that organizes and transmits data between systems is provided. The system and method also includes monitoring, using the monitoring data of a configuration data object, an identified monitoring location to detect a presence of at least one image file received from an image processing device and detecting, at the monitoring location, a presence of a metadata file associated with the at least one image file and determining if a sufficient amount of metadata is included in the metadata file. In response to detecting a sufficient amount of metadata is included in the metadata file, automatically transmitting the at least one image file and metadata file to the destination location identified in the destination data and creating a table in a database based on the structure data and storing the at least one type of metadata therein.

18 Claims, 12 Drawing Sheets

SYSTEM AND METHOD FOR PROCESSING AN ELECTRONIC IMAGE FILE

BACKGROUND OF THE INVENTION

Field of the Invention

The present invention relates generally to managing image files generated by an image processing device, and more particularly to a system and method for organizing, classifying and transferring image files via a network.

Description of the Related Art

Image processing devices may include a plurality of different image processing functions. For example, an image processing device may include any one of a multifunction peripheral, copier, scanner, printer, or other image processing device, and provide the corresponding functionality. The image processing device enables a user to execute various functions, features, and user interfaces in order to perform particular tasks. By way of example, the image processing device and/or application executing on the image processing device may provide functionality for making photocopies, printing a document, scanning a document and generating an electronic document representing the scanned document, transmitting data over a network, accessing a database on a remote server, or other task.

In exemplary operations such as a scanning operation and/or creation of an electronic document via the image processing device, it is desirable for the user initiating these functions to select and/or define attributes associated with the electronic document being created. The user defined attributes may include, but are not limited to, destination for transmitting the file, classification data, grouping data, and description data. Conventionally, this has been done using various client computing systems operable in a networked environment enabling the user to access applications for completing these tasks separately and independently from one another. A system according to invention principles remedies any drawbacks associated with these conventional systems.

BRIEF SUMMARY OF THE INVENTION

Methods, systems, and computer-readable media for processing image file data are described.

In one embodiments, a method, system and non-transitory computer readable medium are provided for generating, at a computing system, a graphical user interface including a plurality of user selectable image elements enabling receipt of user data inputs that are used in creating configuration data object. The configuration data object includes structure data that creates a table in database that stores metadata associated with an image file, the structure data defining a format for the table including at least one type of metadata to be stored therein. The configuration data object also includes monitoring data identifying a location on a data store to be monitored and destination data identifying a location that the at least one type of file is to be transmitted. The monitoring data of the configuration data object is used in monitoring the identified monitoring location to detect a presence of at least one image file received from an image processing device and detecting, at the monitoring location, a presence of a metadata file associated with the at least one image file and determining if a sufficient amount of metadata is included in the metadata file. In response to detecting a sufficient amount of metadata is included in the metadata file, automatically transmitting the at least one image file and metadata file to the destination location identified in the destination data, and creating a table in a database based on the structure data and storing the at least one type of metadata therein. In response to detecting that an insufficient amount of metadata is included in the metadata file, automatically generating a graphical user interface for receiving data inputs from a user enabling a user to modify a value of at least one type of metadata identified as being insufficient and updating the modified metadata file based on data inputs received from the user transmitting the at least one image file and metadata file to the destination location identified in the destination data, and creating a table in a database based on the structure data and storing the at least one type of metadata therein.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 10A & 10B illustrate exemplary operational flows at computing system according to invention principles

DETAILED DESCRIPTION OF THE INVENTION

Figure 1:
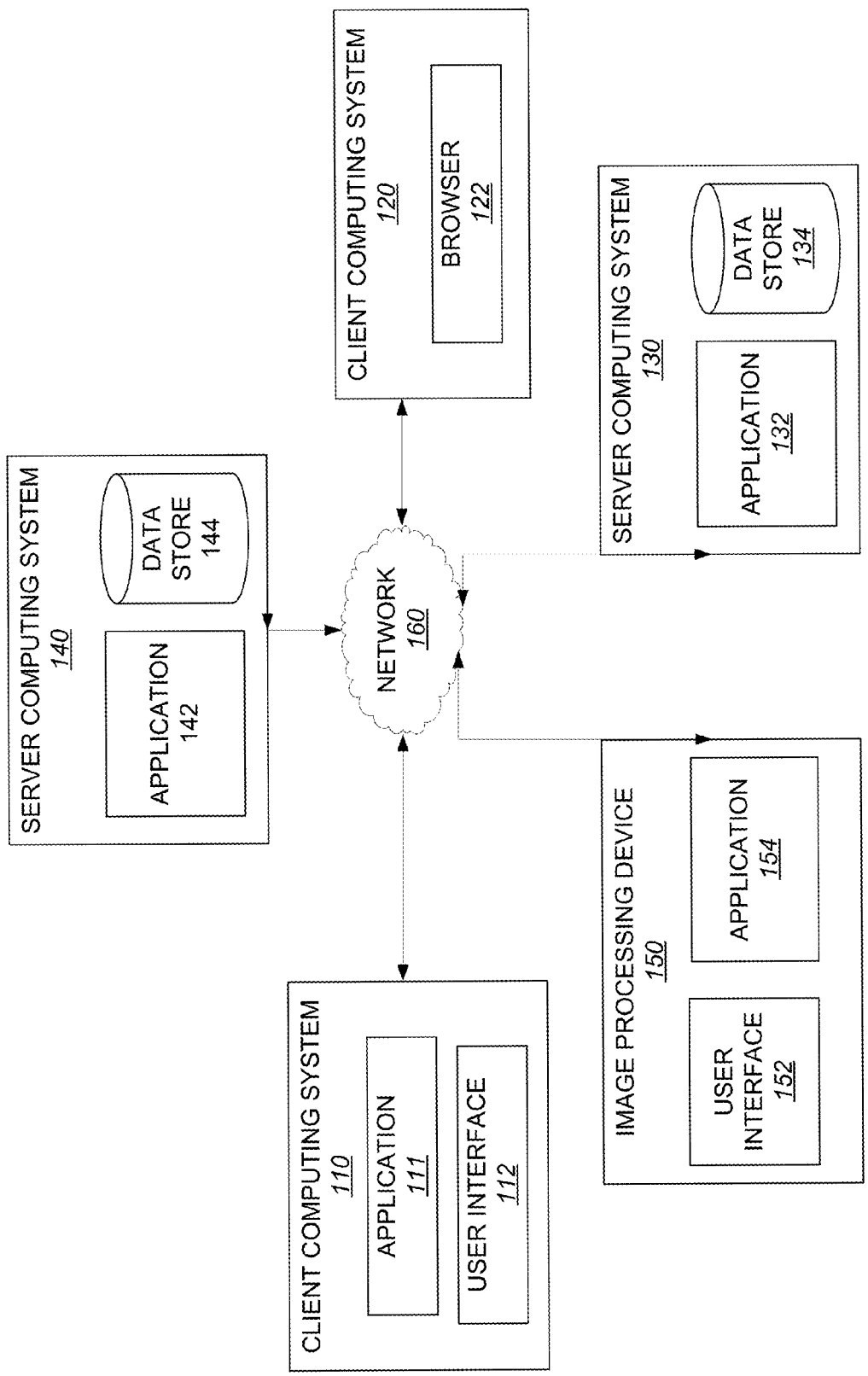
FIG. 1 illustrates an exemplary network environment.

Embodiments of the present invention are described with reference to the drawings. FIG. 1 illustrates an example network environment 100. The networked environment 100 depicts a first client computing system 110, a second client computing system 120, a first server computing system 130, a second server computing system 140 and an image processing device 150 each communicatively coupled to one another via a communication network 160. The number and types of devices shown herein are provide for purposes of example only and should not be construed as limiting in terms of number and types of devices able to be interconnected by communication network 160.

The client computing system 110 includes hardware, software, or both for providing the functionality of the client computing system 110. In some embodiments, the client computing system 110 is unitary. In some embodiments, the client computing system 110 is distributed. The client computing system 110 may span multiple machines of the same or different type.

The client computing system 110 performs one or more steps of one or more methods described or illustrated herein. In some embodiments, the client computing system 110 provides functionality described or illustrated herein. In some embodiments, software running on the client computing system 110 performs one or more steps of one or more methods described or illustrated herein or provide functionality described or illustrated herein. By way of example, the client computing system 110 may include at least one processor that can execute at least one set of instructions stored in at least one type of memory in order to provide the functionality described herein.

The client computing system 110 may include an application 111. The application 111 may include at least one program that, when executed by one or more processors, cause the one or more processors to perform one or more operations described with respect to FIGS. 2-9.

In one exemplary embodiment, the application 111 is an organization application for organizing and processing image files generated by an image processing device (or apparatus). In some embodiments, the application 111 includes configuration functionality, monitoring functionality, editing functionality and processing functionality. The application 111 may improve the operation of the device or system on which it executes by selectively modifying data from one state into a second different state thereby improving the speed at which the device and/or system process and organize data derived from an external device such as an image processing device 150.

The configuration functionality of application 111 enables the user to specify types of metadata to be associated with an image file and create a database in which metadata can be stored in real-time and without the need to pre-design and/or pre-program data access code for database structure. This advantageously enables a user to generate a template for all relevant metadata that is to be associated with the image file. In some embodiments, the configuration functionality allows a user to selectively define rules for at least one of classifying image files, bundling image files and renaming of image files. In other embodiments, the configuration functionality enables a user to define one or more destination locations at which each of the image file and the metadata associated with the image file may be stored.

The monitoring functionality of application 111 selectively monitors at least one location on a data storage device for changes in files stored therein. In one embodiment, the monitoring functionality of application 111 identifies whether a particular type of file is present at the monitored location and uses information contained in the particular type of file to perform associated processing via the processing functionality. The particular type of file may be a metadata file being formatted as a text file having an extension ".txt" or comma separated value file having an extension ".csv" file. These are merely two exemplary format types for metadata files and any file format may be monitored by application 111. In exemplary operation, the information contained in the particular type of file may be used to at least one of classify the associated image file, bundle the associated image file with other image files, rename the image file in accordance with naming rules and forward the image file associated therewith to one or more desired destination locations.

In some embodiments, the application includes editing functionality that allows a user to specify metadata to be associated with a particular image file generated by the image processing apparatus. The metadata specified by the user corresponds to the types of metadata provided during execution of the configuration functionality. In this manner, the editing functionality of application 111 may generate a user interface including fields corresponding to the configured types of metadata that enables the user to input the metadata therein. In other embodiments, the editing functionality can operate in conjunction with the monitoring functionality. In these embodiments, the monitoring functionality can identify the presence of the particular type of file at the monitored location and cause the editing function of the application 111 to be executed automatically. This advantageously enables the user to view the types of metadata generated by the image processing device when producing the associated image file and supplement the metadata with additional metadata corresponding to the types of metadata configured via the configuration functionality.

The processing functionality of application 111 may automatically perform at least one processing operation on one of the image file and associated metadata file. Processing operations include, but are not limited to, bundling or otherwise grouping a set of image files together, optionally including respective metadata files, renaming the files according to user configured naming rules and communicating the files to a user specified desired destination. Other processing operations may include processing the metadata files associated with the image files by communicating them to one of the same or different destination system as their associated image file. Another exemplary processing operation implemented by application 111 may include generating a database having a number of fields corresponding to the types of metadata specified in using the configuration functionality and storing the user-specified metadata included in the associated metadata file in the database.

In some embodiments, the application 111 may provide one or more of the above described functions by creating one or more data objects associated with one or more of the above functions. For example, the application 111 can create a data object that enables one of creating a file based on information contained in the data object, attaching a file to the data object and/or associating a file with the data object. The file may be any suitable file type used in providing the functionality of the application 111. The data object is information which may be incorporated in and/or used by the application 111. In some embodiments, the data object is processed as an entity distinct from other information or components incorporated in or used by the application 111. The data object may include information grouped together by the application 111. A representation of the data object may be presented in a graphical user interface (GUI) as a discrete unit, which may include one or more elements. In some embodiments, the data object may be stored in one or more locations. The data object may include one or more of the following: a data entry, a file, a portion of a file, executable code, a form element, an image, or other content.

The application 111 and the associated data object may be any suitable software application and data object, respectively. By way of example and not by way of limitation, the application 111 may be an image file organization and processing application as discussed above. One exemplary type of data object created may include information for creating and defining structure for a database that will store user-specified metadata associated with one or more image files. A further exemplary type of data object may be a metadata file created using a metadata editing application. Another exemplary data object may include communication instructions for communicating one or more image files and associated metadata files to a destination system. Data objects may also have metadata associated with image files attached thereto for use by a database application in storing user-specified metadata in the data. Data objects may also include one or more rules for bundling or combining a plurality of image files together. Data objects may also include rules for renaming one or more image files using user-specified metadata. These types of data objects are described for purposes of example only and the application 111 may generate any number of types of data objects in order to execute any of the above-described functionality. Thus, the invention is not limited to the above examples. Other suitable files, data objects and associated applications than those recited herein are contemplated.

In some embodiments, the various functions of application 111 may output data to a user interface 112 (discussed below) for presentation to the user enabling the configuration and generation of the database for storing metadata associated with image files as well as the editing of the metadata associated with the image file. In other embodiments, the application may output data representative of graphical user interfaces for output via the user interface 112 enabling the configuration, monitoring, processing and editing functions of application 111 to be realized.

The client computing system 110 includes the user interface 112. The user interface 112 includes hardware, software, or both for providing the functionality of the user interface 112. The user interface may receive input signals from a user and generate output signals that are displayed by a display device. The display device may be embodied within the user interface 112 or electrically coupled thereto. The user interface 112 facilitates interaction between a user and the client computing system 110. In some embodiments, the user interface 112 facilitates the interaction between the client computing system and any of the other client computing systems 120, server computing systems 130, 140 and the image processing device 150.

The user interface 112 may receive information from the application 111 that controls the operation of the user interface 112 to implement the functions of application 111. In some embodiments, the information received from the application 111 includes data objects defining the structure and type of output to be generated by the user interface 112. By way of non-limiting example, the application 111 may output data objects representative of elements to be included in a graphical user interface associated with at least one of the functions of application 111. The user interface 112 may use these data objects and generate the graphical user interface based on these data objects.

In some embodiments, the user interface 112 receives input data signals generated by an input/output (I/O) device in order to facilitate the interaction referenced above and described in further detail below. Exemplary I/O devices include but are not limited to keyboards, mouse, touch sensitive displays, microphones, gesture-based input devices and the like.

Client computing system 120 includes hardware, software, or both for providing the functionality of the client computing system 120. In some embodiments, the client computing system 120 is unitary. In some embodiments, the client computing system 120 is distributed. The client computing system 120 may span multiple machines of the same or different type.

The client computing system 120 may perform one or more steps of one or more methods described or illustrated herein. In some embodiments, the client computing system 120 provides functionality described or illustrated herein. In some embodiments, software running on the client computing system 120 performs one or more steps of one or more methods described or illustrated herein or provide functionality described or illustrated herein. By way of example, the client computing system 120 may include at least one processor that can execute at least one set of instructions stored in at least one type of memory in order to provide the functionality described herein.

The client computing system 120 may have a browser 122 executing thereon. The browser may be a web browser such as MICROSOFT INTERNET EXPLORER, GOOGLE CHROME or MOZILLA FIREFOX, and may be used to access a resource, such as a web page. The browser 122 may enable a user to display and interact with text, images, form elements, or other information typically located on a web page served by a web server on the World Wide Web or a local area network. The browser may support various types of downloadable, executable, software modules, such as applets or plug-ins. For example, the browser may incorporate a virtual machine configured to execute a program, such as a JAVA applet, embedded in a web page accessed by the browser 122. The client computing system 120 may have various add-ons, plug-ins, or other extensions for use in or with the browser 122.

In some embodiments, the browser 122 may display a collection of text and image elements that are accessible by a user and which enable the user to perform any of the functionality set forth above with respect to application 111 of client computing system 120. In this type of embodiment, the functionality of application 111 may be implemented by a server computing system (discussed below) and selectively accessible, via network 160, by the browser 122 of client computing system 120.

The browser 122 executing on client computing system 120 may enable access to an application hosted on a remote computing system that, when executed by one or more processors, cause the one or more processors to perform one or more operations described with respect to FIGS. 2-9.

The server computing system 130 includes hardware, software, or both for providing the functionality of the server computing system 130. The server computing system 130 may include one or more servers. For example, the server computing system 130 may include one or more application(s) servers, authentication servers, web servers, file servers, database servers or mail servers. In some embodiments, the server computing system 130 is unitary. In some embodiments, the server computing system 130 is distributed. The server computing system 130 may span multiple locations. The server computing system 130 may span multiple machines.

The server computing system 130 includes the application 132 and the data store 134. These components of the server computing system 130 reside in the server computing system 130 in any suitable manner. For example, these components may reside on one or multiple servers. In some embodiments, one or both of these components may be provided as part(s) of a software application. In some embodiments, one or both of these components may be provided as a stand-alone software application.

The server computing system 130 provides access to the application 132. The application 132 includes one or more programs and related data. The application 132 may include one or more programs for controlling access to the application 132 or for controlling access to one or more resources of the application 132.

In certain embodiments, the application 132 may provide the various types of functionality described above with respect to application 111 executing on client computing system 110. In providing the various functionality, application 132 may similarly generate any or all of the data objects generated by application 111. In this type of embodiment, the organizing and processing of image files generated by an image processing device (or apparatus) may be controlled centrally and provide the configuration functionality, monitoring functionality, editing functionality and processing functionality to a plurality of client computing systems 110, 120 via the network 160.

In embodiments, where client computing system 110 is accessing application 132 on server computing system 130, the application 111 of client computing system 110 may be a client application programming interface (API) stored locally in memory for interacting and communicating with server application 132.

In some embodiments, where client computing system 120 accesses application 132 on server computing system 130, application 132 may utilize web server functionality enabling the browser 122 on client computing system 120 to access and communicate with application 132 to make use of the functionality provided by application 132. The application 132 may include one or more programs for receiving HTTP requests and providing HTTP responses. For example, the application 132 may serve content in the form of a web page in response to a request from a web browser. The web page may be static or dynamic and may comprise HTML files, or other suitable files, executable programs, form elements, images, or other content. One or more elements of the web page content may be stored at the server computing system 130. In some embodiments, the application 132 uses SOAP to receive and send messages. The use of SOAP protocol for communicating messages is described for purposes of example only and any type of communication protocol may be employed by the server computing system 130.

In some embodiments, the application 132 provides functionality for maintaining and accessing information stored in the data store 134. The application 132 may perform various operations with respect to the data store 134. Exemplary operations include adding entries to the data store 134; deleting entries from the data store 134; modifying entries in the data store 134; searching for entries in the data store 134; and retrieving entries from the data store 134.

In some embodiments, information stored in the data store 134 may be grouped and organized hierarchically. Data entries may represent entities, attributes, values or other suitable information. Data entries may be metadata describing an image file. The information in the data store 134 may be grouped in any suitable manner and may be grouped for any suitable reason, such as for implementing task-specific functionality of the application 132, or to correspond to an organization's structure. The data store 134 may include all or a portion of one or more data objects described above.

In some embodiments, the application 132 provides image file management functionality and interfaces with an image processing device 150 (discussed below) that generates at least one image file. In this embodiment, the application 132 receives image file data generated by the image processing device 150 and stores the received image file data in a user-specified location in the data store 134. In other embodiments, the application 132 may also receive metadata generated by the image processing device 150 and which is associated with image files generated thereby.

The location at which the image file and/or associated metadata files are stored may be an intermediate file storage location that is selectively accessible by any of the client computing systems 110, 120. In other embodiments, the storage location may represent a destination location for one of the image file and associated metadata file.

The server computing system 140 includes hardware, software, or both for providing the functionality of the server computing system 140. The server computing system 140 may include one or more servers. For example, the server computing system 140 may include one or more application(s) servers, web servers, file servers, or database servers. In some embodiments, the server computing system 140 is unitary. In some embodiments, the server computing system 140 is distributed. The server computing system 140 may span multiple locations. The server computing system 140 may span multiple machines.

The server computing system 140 includes the content management service 142 and the data store 144. These components of the server computing system 140 reside in the server computing system 140 in any suitable manner. For example, these components may reside on one or multiple servers. In some embodiments, one or both of these components may be provided as part(s) of a software application. In some embodiments, one or both of these components may be provided as a stand-alone software application.

The server computing system 140 provides access to the content management service 142. The content management service 142 includes programs and related data. The content management service 142 may include one or more programs for controlling access to the content management service 142 or for controlling access to one or more resources of the content management service 142. In some embodiments, the content management service 142 may use an authentication service to authenticate entities seeking access to resources of the content management service 142. In some embodiments, the content management service 142 includes functionality for controlling access to a resource of the application 132 in server computing system 130 and/or application 111 of client computing system 120.

In some embodiments, the content management service 142 executing on the server computing system 140 provides web server functionality. The content management service 142 may include one or more programs for receiving HTTP requests and providing HTTP responses. For example, the content management service 142 may serve content in the form of a web page in response to a request from a web browser. By way of example, these web pages generated by the content management service 142 may be selectively viewable on a browser 122 of client computing system 120. The web page may be static or dynamic and may comprise HTML files, or other suitable files, executable programs, form elements, images, or other content. One or more elements of the web page content may be stored at the server computing system 140. In some embodiments, the content management service 142 uses SOAP to receive and send messages.

In some embodiments, the content management service 142 is enterprise software. The content management service 142 may provide features enabling content to be shared across an organization. For example, the content management service 111 may include functionality for receiving, storing, organizing, and providing access to information, files, or other content for members of an organization or group.

In some embodiments, the content management service 142 provides functionality for maintaining and accessing information stored in the data store 144. The content management service 111 may perform various operations with respect to the data store 144. Examples of operations include adding entries to the data store 144; deleting entries from the data store 144; modifying entries in the data store 144; searching for entries in the data store 144; and retrieving entries from the data store 144.

In some embodiments, the content management service 142 provides functionality for storing a file in the data store 144 and for retrieving a file from the data store 112. The file may be an image file, a metadata file, an electronic document or other suitable file. Additionally, the content management service 142 may provide functionality for storing information associated with the file in the data store 144. Examples of information associated with the file include information that identifies the file, information for locating the file, and information about the file.

The information in the data store 144 may be organized in any suitable manner and may be grouped for any suitable reason, such as to correspond to an organization's or a group's structure, or in accordance with user settings. In some embodiments, the data store 144 includes a file that is an attachment to a data object associated with one of application 111 on the client computing system and application 132 on the server computing system 132.

In some embodiments, one or both of the content management service 142 and the data store 144 may reside in the server computing system 130; and/or one or more operations performed by the server computing system 140 may be performed by the server computing system 130. For example, the content management service 142 and the data store 144 may be included in the server computing system 130 instead of in a separate server computing system 140.

The image processing device 150 includes hardware, software, or both for providing the functionality of the image processing device 150. In some embodiments, the image processing device 150 performs one or more steps of one or more methods described or illustrated herein. In some embodiments, the image processing device 150 provides functionality described or illustrated herein. In some embodiments, software running on the image processing device 150 performs one or more steps of one or more methods described or illustrated herein or provides functionality described or illustrated herein.

In some embodiments, the image processing device 150 includes hardware, software, or both for providing scanning/copying functionality. For example, the image processing device 150 may include an image sensor or a camera for capturing an image. In some embodiments, the image processing device 150 scans a physical document to generate electrical signals which are converted to digital image data representing the scanned physical document. The image processing device 150 may convert the digital image data into an electronic document or image file representing the scanned physical document and send the electronic document to a destination.

The image processing device 150 includes a user interface 152. The user interface 152 includes hardware, software, or both for providing the functionality of the user interface 152. The user interface 102 may include an operation panel. The user interface 152 may output signals and receive input signals via the operation panel so as to facilitate interaction between a user and the image processing device 150. An operation panel may include a hard key panel and/or a touch sensitive display. A user may provide user input operations via the hard key panel and/or the touch sensitive display to control the image processing device 150 via the operation panel. For example, the user may press one or more hard buttons to issue one or more commands. Further by way of example, a user may provide a touch input to an interface element displayed on the display to issue a command and/or to make a selection. Moreover, the image processing device 150 may output information to the user and issue requests by outputting images on a display.

In some embodiments, a browser may execute on the image processing device 150. In some embodiments, the user interface 152 comprises information displayed by the browser. The browser may be a web browser such as MICROSOFT INTERNET EXPLORER or MOZILLA FIREFOX, and may be used to access a resource, such as a web page. The browser may enable a user to display and interact with text, images, form elements, or other information typically located on a web page served by a web server on the World Wide Web or a local area network. The browser may support various types of downloadable, executable, software modules, such as applets or plug-ins. For example, the browser may incorporate a virtual machine configured to execute a program, such as a JAVA applet, embedded in a web page accessed by the browser. The image processing device 150 may have various add-ons, plug-ins, or other extensions for use in or with the browser.

The image processing device 150 executes at least one application 154 which includes programs and related data. In some embodiments, the application 154 executing on the image processing device 150 performs one or more steps of one or more methods described or illustrated herein or provides functionality described or illustrated herein. By way of example and not by way of limitation, programs of the application 154 may include instructions which, when executed by one or more processors, cause the one or more processors to perform one or more operations described with respect to FIG. 2-9.

In some embodiments, the application 154 includes one or more programs for controlling access to one or more resources on the image processing device 150. In some embodiments, the application 154 includes one or more programs for controlling access to the application 154 and/or particular functionality of the application 154. In some embodiments, access to one or more resources of the application 154 is controlled based on a credential associated with the entity attempting to access the one or more resources of the application 154. Policies for controlling access to various resources of the application 153 may be stored at the image processing device 150. In other embodiments, access control policies may reside in a centralized or enterprise server remotely located from the image processing device 150.

Once access to the application 154 is granted, a user gains access to one or more resources of the application 154, including task-specific functionality of the application 154. The task-specific functionality of the application 154 may enable the user to perform one or more tasks using the application 154. For example, the application 154 may provide various functions, features and user interfaces for processing image data, transmitting data over a network, managing one or more databases, or other tasks. In some embodiments, the application 154 is configured to use one or more resources of the image processing device 150 to perform a process in response to an instruction from the user.

For example, the application 154 may use functionality of and/or information on the image processing device 150 to employ hardware, software, or both for that provides scanning functionality. For example, the image processing device 150 may include an image sensor or a camera for capturing an image. In some embodiments, the image processing device 150 scans a physical document to generate electrical signals which are converted to digital image data representing the scanned physical document. The digital image data may be converted into an electronic document (e.g. image file) representing the scanned physical document and sent to a destination. The electronic document (or image file) generated by the image processing device may include text and/or image data.

In certain embodiments, the application 154 executing on the image processing device 150 provides communication functionality for transmitting image file via the network 160 to any other computing system and/or server connected thereto. The communication functionality of the application 154 also enables the image processing device 150 to receive instruction data from other systems on the network 160 enabling access to and control of any functionality provided by application 154. The communication functionality of application 154 may also enable the image processing device 150 to receive and process data objects generated by any system connected to the image processing device 150 via the network 160.

In some embodiments, the application 154 executing on the image processing device 150 provides functionality for maintaining and accessing information in a data structure, which may be any suitable data structure for organizing data. For example, information associated with a user or process may be added as one or more entries into a data structure. The application 154 executing on the image processing device 150 may store and/or retrieve data in a memory or on a hard disk of the image processing device 150. In some embodiments, the image processing device 150, when executing the application 154, may perform various operations with respect to a data store. Examples of operations include adding entries to a data store; deleting entries from a data store; modifying entries in a data store; searching for entries in a data store; and retrieving entries from a data store. The data store management functionality provided by application 154 discussed above is also applicable to data stores located on remote computing systems and/or servers connected to the image processing device 150 via the network 160.

The application 154 executing on the image processing device 150 may provide functionality for generating information and providing the information to the user interface 152 of the image processing device 150. The information may include text, images, form elements, files, executable programs, or other suitable information. The information provided by the application 154 may include content for display on a display of the image processing device 150.

The network 160 couples the one or more servers 130, 140 and one or more client computing systems 110, 120 and the image processing device 150 to each other. The network 160 may be any suitable network. For example, one or more portions of the network 160 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 160 may include one or more networks.

It should be understood that the architecture and systems describe hereinabove with respect to FIG. 1 are merely representative and should not be construed as limiting. The architecture in which the present invention is operative may include any number of servers and/or client computing devices. Moreover, the functionality described above with respect to each of the client computing systems 110, 120; servers 130, 140 and image processing device 150 is described to facilitate the understanding of the various functionality available for use with the present invention and one or more of the component systems described individually may be combined with any of the other components described therein. Furthermore, throughout the application, the term computing system, when used generally, may refer to any one of or more than one of the client computing systems 110, 120; servers 130, 140 and image processing device 150 shown and described in FIG. 1

Figure 2:
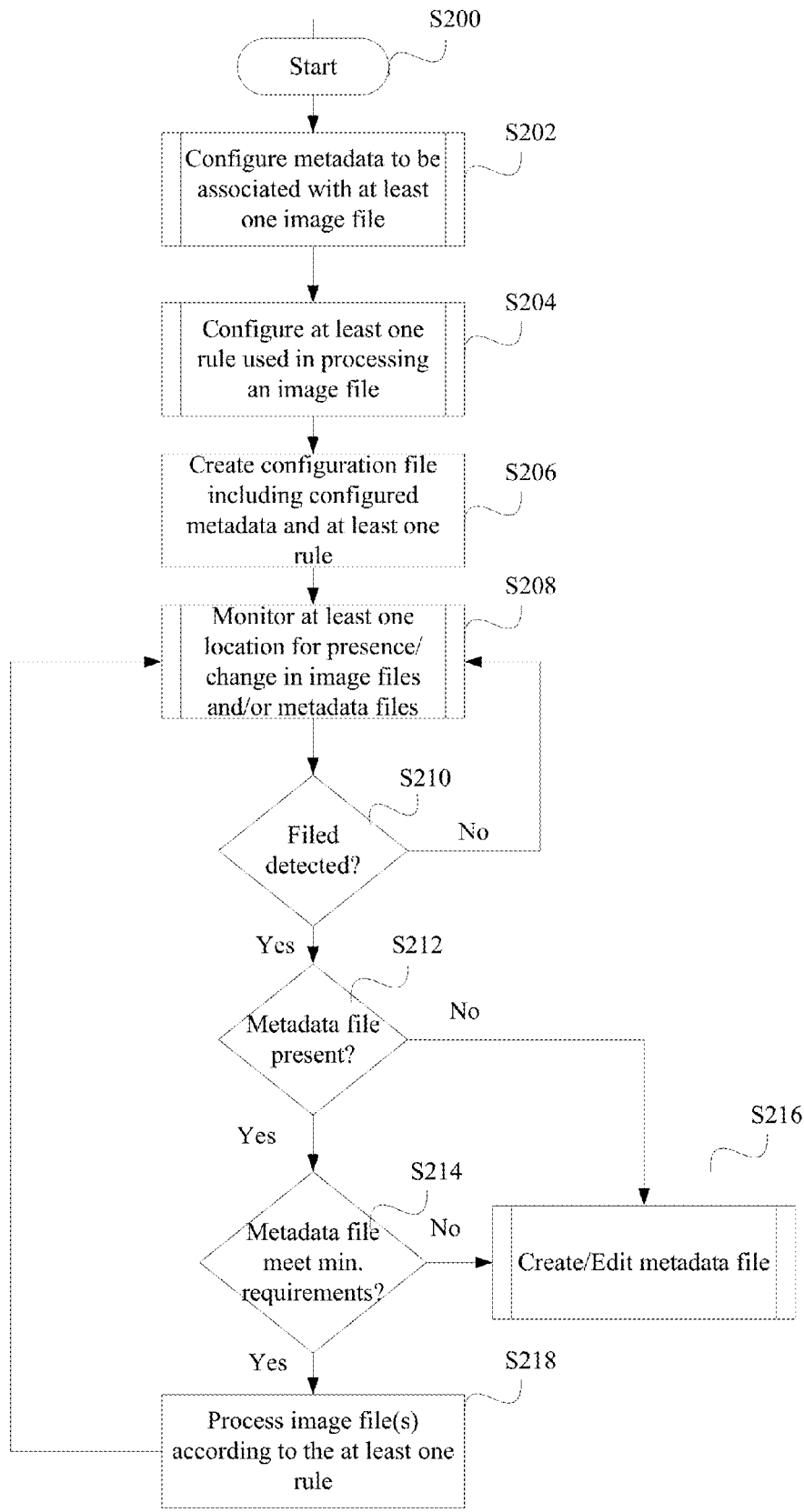
FIG. 2 illustrates an exemplary operational flow at computing system according to invention principles.

FIG. 2 is described with reference to the example network environment 100 of FIG. 1. FIG. 2 illustrates a representative algorithm defining the operational flow of the system according to invention principles. The operational flow described hereinbelow may be implemented by any of application 111, application 132, application 142 and/or application 154. In each instance, execution of the application in the following manner advantageously improves the operation of the device on which it executes by minimizing an amount of technical knowhow required by a particular user while enabling the device to perform advanced functionality.

In one embodiment, the algorithm of FIG. 2 may be a program or set of programs embodied as application 111 in the client computing system 110. In this embodiment, one or more processors of client computing system 110 initiate execution of the algorithm in step S200. In certain instances, the steps described herein with respect to FIG. 2 represent various modules which may or may not include sub-routines or sub-algorithms specifically directed to provide certain application functionality and will be identified and will be discussed with respect to other Figures hereinafter. In other embodiments, the algorithm of FIG. 2 may be embodied as application 132 on server 130 or as application 142 on server computing system 140. In certain embodiments the algorithm of FIG. 2 may be embodied as application 152 on image processing device 150. Thus, while the following description may refer to application 110, it should be understood that it may be any of applications 132, 142 or 152 can include and execute the described features.

In step S202, the application enables the user to configure at least one type of metadata to be associated with at least one image file that is generated by the image processing device 150. Configuration of metadata may include specifying at least one type of metadata is mandatory in order for the metadata file to be valid. For the metadata file to be valid the at least one type of metadata field must have a value present therein. In certain embodiments, more than one type of metadata may be mandatory. The inclusion and specification of at least one type of metadata as mandatory presents a criteria that enables the application to determine whether or a particular metadata file is valid.

In one embodiment, step S202 is executed as part of a configuration module that advantageously enables the user to define the metadata to be associated with the generated image file. An exemplary algorithm for configuring metadata is described hereinafter with respect to FIG. 3. Metadata may include any type of information that is associated with and/or describes the at least one image file in any manner. Exemplary types of metadata include data identifying any of (a) source file name; (b) destination file name; (c) destination address; (d) destination folder name; (e) user name; (f) user password; (g) category of image file; (h) type of image file; (i) date and time of image capture; (j) date and time of image transmission; and (k) miscellaneous information describing the image file. These types of metadata are merely exemplary and the metadata may be any type of data identifying any characteristic associated with the at least one image file captured and generated by the image processing device 150.

In one embodiment, step S202 may be implemented by generating a user interface including a plurality of image elements that allows a user to configure the metadata by selecting and/or inputting respective commands to generate data objects that identify the various metadata to be associated with the at least one image file. In some embodiments, the user interface may be graphical. In other embodiments, the user interface may be text-based. An exemplary user interface enabling metadata configuration is shown in FIG. 4 an will be discussed in greater detail hereinbelow.

In step S204, application 111 enables the user to configure at least one rule used for processing an image file created by the image processing device 150. In one embodiment, the at least one rule configured in step S204 includes data identifying at least one location to be monitored for detecting the presence of the at least one image file. The location to be monitored may be local directory that receives image data from the image processing device on the computing device executing application 111. In other embodiments, the location to be monitored may be located on one of server computing systems 130 or 140 that are accessible to the computing device 110 (or 120) via the network 160. In another embodiment, the location to be monitored may be on a data store or other storage device in (or connected to) the image processing device 150.

In another embodiment, the at least one rule configured by the user may be a logging rule that sets forth at least one of a type of action to be logged and a frequency that the logging operation is to occur. In other embodiments, the logging rule may also include any of (a) data identifying a maximum size for a log file; and (b) a time span defining how long of a time period logging data will cover (e.g. one week, one month, etc) The at least one type of action may be any action or other processing performed on the at least one image file created by the image processing device. In one embodiment, the at least one type of action may include any of (a) an error value; (b) an action related to a destination for a particular image file; (c) an action relating to the source that created the image file; and (d) an action related to an image category.

In another embodiment, the at least one rule to be configured in step S204 is a processing rule that sets forth how the application 111 is to process the at least one image file generated by the image processing device 150. Exemplary types of processing rules may include any of (a) specifying, from the configured metadata, respective type of metadata for use in naming the at least one image file; (b) creating a naming format for the at least one image file using the configured metadata; (c) defining at least one storage characteristic for the destination system; (d) defining a location at the destination for storing the at least one image file; (e) specifying at least one type of account access for the at least one image file; and (f) specifying at least one user having access to the at least one image file at the destination system. These exemplary processing rules are not intended to be limiting and a user may use the user interface to create any type of rule defining how the at least one image file is to be processed.

In step S206, the application 111 uses data object representative of the configured metadata and data objects representative of the at least one processing rules to generate a configuration file accessible by a monitoring module executed by the application 111 which monitors the location(s) specified in the at least one processing rules. Thus, steps S202-S206, individually or collectively, represent a configuration module of application 111. The configuration file generated in S206 is stored at a location in a data store and is accessible by the application 111 in order to complete the monitoring and transmission functions as discussed hereinafter.

In step S208 application 111 initiates the monitoring module to selectively monitor the location specified by the user in the configuration file stored on the data store. The monitoring module of application 111 parses the configuration file to identify the location on the data store to be monitored and detect the presence of one of (a) at least one image file and (b) at least one metadata file. In step S210, the monitoring module periodically polls the location specified in the configuration file to detect if any files are present at the specified location. If the result of the poll in S210 is negative ("NO" in S210) the monitoring module reverts back to S208 and begins a countdown process, the conclusion of which results in a further poll request to detect whether or not there are files present at the specified location. If the poll in step S210 detects files present at the specified location ("YES" in S210), the monitoring module, in step S212 determines whether or not the file present is a metadata file. This determination may be made by the application 111 comparing a file format of a detected file with a set of predetermined file formats. If a match is detected ("YES" in S212), the application in S214, parses the metadata file to determine whether the metadata file meets a predetermine criteria. Predetermined criteria may include at least one type of metadata that, according to the configuration file, must be present in order to perform further processing according to the one or more rule specified in the configuration file. In one exemplary embodiment, the predetermined criteria is metadata identifying a destination for the at least one image file generated by the image processing device 150. In other embodiments, the predetermined criteria may include at least two types of metadata that is associated with the at least one image file. In step S218, in response to detecting that the predetermined criteria has been met in step S214, the application 111 initiates an execution module and processes the at least one image file present in the predetermined monitored location according to the one or more rules in the configuration file. Once the processing has been completed, the application 111 reverts back to S208 to continually monitor the location specified in the configuration file.

If the determination in step S212 is negative indicating that a file is detected in the monitored location but the file is not a metadata file (NO in step S212), the application 111, in step S216, advantageously launches a metadata creation/modification module that enables the user create a metadata file to be associated with the at least one image file that was detected in step S210. The metadata creation/modification module launched in step S216 advantageously generates a GUI that allows the user to specify or otherwise define at least one type of metadata that will be associated with the at least one image file detected in the monitored location. In some embodiments, in the creation mode of the module launched in step S216, the application parses the configuration file to identify the type of metadata indicated as being mandatory and prepopulates a field with the mandatory metadata type which advantageously directs the user to specify a value for the prepopulated metadata category. This mode similarly allows the user to also enter additional types of metadata and values for each type selected by the user.

Similarly, if the determination in step S214 is negative ("NO" in S214) indicating that the monitored location includes a metadata file but the metadata file does not include either the predetermined metadata type that satisfies the criteria or that the metadata file includes the type of metadata but has no value in the metadata field, the application 111 also launches the metadata creation/modification module in step S216. This advantageously allows the user to one of add the type of metadata required or add a value to a metadata field that is required but for which no value is present. In certain embodiments, launching the configuration/modification module results in generation of a GUI for display to a user. The GUI allows the user to specify the type of metadata that is mandatory or enter a value in an empty metadata field. Additionally, this module allows the user to selectively add further types of metadata and associated values to the metadata file associated with the at least one image file present in the monitored location. Further description of the metadata configuration/modification module will be provided with respect to FIGS. 9 and 10A-10B.

In some embodiments, the monitoring activities occurring in steps S208, S210, S212 and S214 may include monitoring a location on a local data store. In other embodiments, the monitoring may include generating a monitoring request including a location on a network 160 to be monitored and transmitting the monitoring request via network 160 to the location specified in the request. In another embodiment, the monitoring activities occurring in steps S208, S210, S212 and S214 may include a command to control an application executing on a remote computing device at the specified location to initiate monitoring of the specified location and receive a return message from the remote application including whether or not there are files present at the location, and of if so, whether or not the files are metadata files including meeting the predetermined validity criteria as discussed above.

Figure 3:
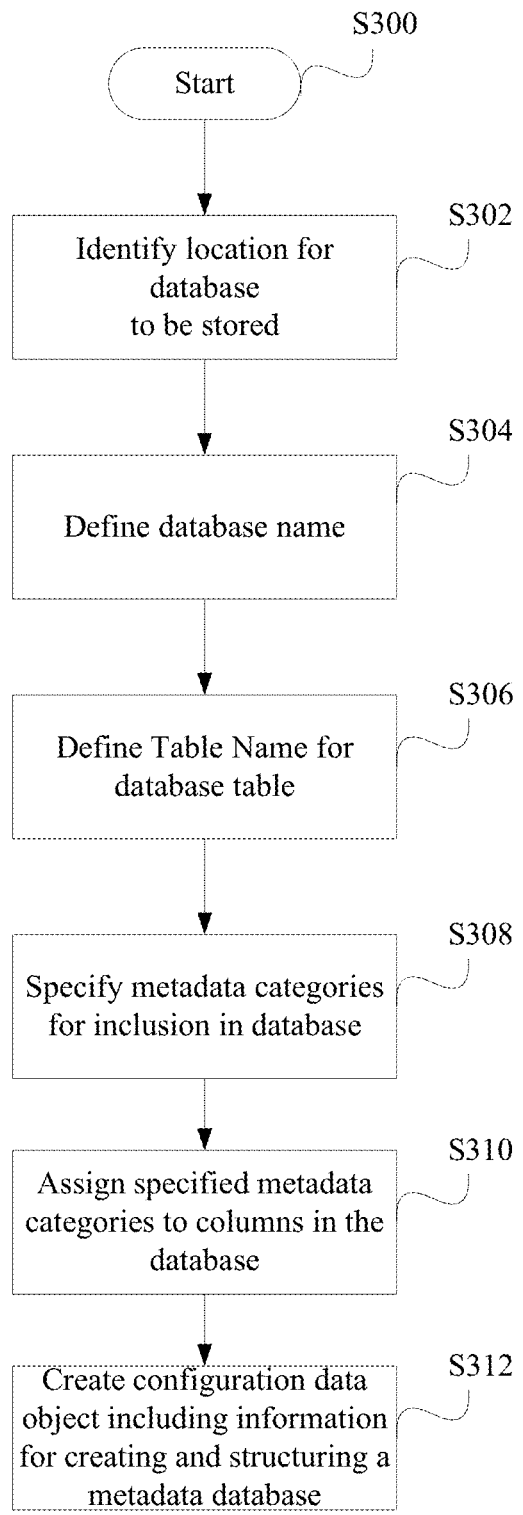
FIG. 3 illustrates an exemplary operational flow at computing system according to invention principles.

Turning now to FIG. 3, which provides additional detail as to how the application 111 advantageously enables the user to automatically create a database in which the metadata configured in step S202 in FIG. 2 may be stored. These activities advantageously automatically creates and structure an individual database for storing the metadata associated with the at least one image file. Each created database may be uniquely structured and specific the one or more image files associated therewith. This automatic creation and specification of database structure using the configured metadata alleviates the need to have individuals specifically trained to hard-code the database structure. Additionally, application 111 provides an improvement to the functioning of the computing system on which application 111 is executing because it allows for increased flexibility in structure and creation of the database as well as improved security because only metadata associated with a specific image files or files is stored in the file-specific database and thus accessible to the user who created the file or a particular user specified by the creating user.

In step S300, the configuration module executed in step S202 in FIG. 2 initiates the metadata configuration routine. At step S302, the application 111 receives, from a user input data identifying a location on a computing device for storing a metadata database that is associated with the at least one image file. To accomplish this, the application 111 generates a GUI that includes a plurality of image elements that allow for the application to receive data from various inputs. In certain embodiments, the GUI includes user-selectable image elements that allow a user to use an input device (e.g. mouse, touch pad etc) to move a pointer and select the image element in order to initiate an action by the application. In other embodiments, the GUI may include a candidate set of data items from which a user may select via a check box. In further embodiments, the GUI may include a free-form data entry image element allowing a user to select the element and use an input device (e.g. keyboard, mouse, voice command, etc.) to enter user-specific data.

In step S304, the application 111 receives input from a user specifying a name for the database to be created at the location specified in step S203. In one embodiment, the GUI generated by the application 111 includes a free form data input field that allows the user to enter alphanumerical text therein to provide a name for the database to be stored at the location specified in step S302. In step S306, the GUI generated by application 111 receives user input representing a table name for the table in the database being created. In certain embodiments, the application 111 receives table name data for a single table. In other embodiments, the application 111 may receive name data for a plurality of tables to be stored in the database. In step 308 the application 111 receives data representing the categories or types of metadata to be stored in the at least one table of the database and in step S310, the application receives data assigning a position in the database table being created. In one embodiment, steps S308 and S310 are performed by entering alphanumeric characters in a predetermined format into a free-form text based data entry field presented in the GUI. For example, the format syntax may be "column letter: metadata category," whereby the column letter represents column in metadata file and metadata category is the database table column name. This results in the metadata column value from the metadata file being saved in table column named by "metadata category". A first separator, ":" is positioned between the column letter and metadata category values which enables the application 111 to differentiate metadata position and metadata category when creating the structure the table of the database on the fly. A second separator "," is positioned after the metadata category data item indicating that a further metadata category positioned in a further column is present. The use of a colon ":" as the first separator and the comma "," as the second separator are described for purposes of example only and any non-letter or non-number may be used to separate the various types of metadata categories and respective positions in a database table for those metadata categories.

In step S312, the application 111 uses the values of the data items received in the GUI to create a configuration data object that includes a structure and format data for use in creating a metadata database for storing metadata associated with the at least one image file. This configuration data object created in accordance with the algorithm in FIG. 3 is usable by other modules of application 111 when completing module specific tasks such as processing the at least one image file and any metadata associated therewith according to at least one processing rule specified by the user as will be discussed hereinafter.

FIG. 4 illustrates the processes associated with configuring at least one rule used in processing the at least one image file generated by the image processing device 150 and any metadata file associated with the at least one image file. The algorithm begins at step S400 when the application 111 executes its configuration module. It should be noted that the configuration module executed by application 111 may include the steps set forth in FIG. 3 discussed above as well as those set forth in FIG. 4 and discussed below.

In step S405, application 111 determines the type of rule sought to be created by user. Application 111 enables the user to define at least one of (a) a monitoring rule defining a location to be monitored; (b) a logging rule defining actions to be logged, frequency for generating the log, and duration of time covered by the log file (e.g. month, week, etc); (c) a processing rule defining at least one action to be taken when processing the at least one image file. In one embodiment, the ability to define the types of rules and any characteristics of the rules are provided within a GUI generated by application 111 and presented to the user on a display device of the computing system executing application 111. To accomplish this, the application 111 generates a GUI that includes a plurality of image elements that allow for the application to receive data from various inputs. In certain embodiments, the GUI includes user-selectable image elements that allow a user to use an input device (e.g. mouse, touch pad etc.) to move a pointer and select the image element in order to initiate an action by the application. In other embodiments, the GUI may include a candidate set of data items from which a user may select via a check box. In further embodiments, the GUI may include a free-form data entry image element allowing a user to select the element and use an input device (e.g. keyboard, mouse, voice command, etc.) to enter user-specific data.

The following represents the steps associated with creating the various types of rules and presented in three parallel flows. This is provided for ease of understanding and should be not be construed as happening in any particular sequence. Instead, a single GUI may include a plurality of different types of data fields for receiving inputs associated with creating each type of rule. Alternatively, a series of rule specific GUI can be generated in response to selecting an image element associated with a respective type of rule being created.

Steps S410-S414 represent the applications 111 process in creating a monitoring rule. In step S410, application 111 receives from a user, via a least one data entry image element, data representing a location on a computing device to be monitored. The location data may represent a location on the computing device executing application 111 or a location on any other type of computing device, server or image processing device that is accessible via network 160. The location data may include address information used to access the location. In other embodiments, the location data may include user access credential data representing user names and password for accessing the particular location. In step S412, application 111 receives from a user, via a least one data entry image element, data representing at least one type of file to be monitored at the location specified in step S410. In one embodiment a file type to be monitored is specified as one of a text file having a file extension ".txt" and a comma-separated value file having a file extension ".csv". In other embodiments, the type of file to be monitored may be any of (a) an image file in any image file format (e.g. .jpg, .gif, .tif, etc); (b) a portable document file formatted file having an extension ".pdf"; and (c) an extensible markup language file having an extension ".xml". In step S414, application 111 creates and stores a monitoring rule data object which is accessible by application 111 to provide operational instructions for the application 111 when executing the monitoring module (steps S208-S214 in FIG. 2).

Referring back to step S405, upon determining that the rule creation routine is being used to create a logging rule which governs and controls how and where the application 111 may store any data about application functionality, the application 111, in step S420, receives data input from a user via at least one data input image element in a GUI to any of select, define, specify or otherwise choose at least one type of action to be recorded in a log file. In one embodiment, an action to be logged includes any information associated with execution of the monitoring module. This may include any of (a) date and/or time files were indicated as present at a location being monitored; (b) data identifying the location being monitored; (c) data identifying an address of a destination system that at least one image file is being transferred; (d) data identifying a location of a database created to store metadata associated with the at least one image file; and (e) at least one characteristic associated with the at least one image file and/or metadata file associated with the at least one image file.

In step S422, the application 111, receives data input from the user via at least one data input image element in the GUI to select, define, specify or otherwise choose a frequency for creating a log file including the types of actions set in step S420. In one embodiment, the frequency may be periodic. In another embodiment, the frequency may be action-dependent so as to execute the logging function any time any file in the monitored location is processed in any manner. In other embodiments, the logging frequency may be a particular time and date specified by the user. These are merely exemplary and a user can set the frequency for generating a log file in any manner.

In step S424, the application 111, receives data input from the user via at least one data input image element in the GUI to select, define, specify or otherwise choose a location for storing a log file including the types of actions set in step S420. The location may be on the computing system executing the application 111 or any other computing system connectable to the computing system executing the application 111. Additionally, in other embodiments, defining the location may also include generating a message including the log file and addressing the generated message to a particular user. Thus, in one embodiment, defining the location may include specifying an electronic mail address for a user. In another embodiment, defining a location may include specifying an address of a computing system located on one of a wide area network and local area network (e.g. IP address, computer/server name, directory name, etc.).

In response to receiving the data in each of steps S420-S424, the application 111 generates a logging rule data object in step DS426. The logging rule data object created in step S426 is accessible by application 111 to provide operational instructions for the application 111 when executing the monitoring module (steps S208-S214 in FIG. 2).

Figure 4A:
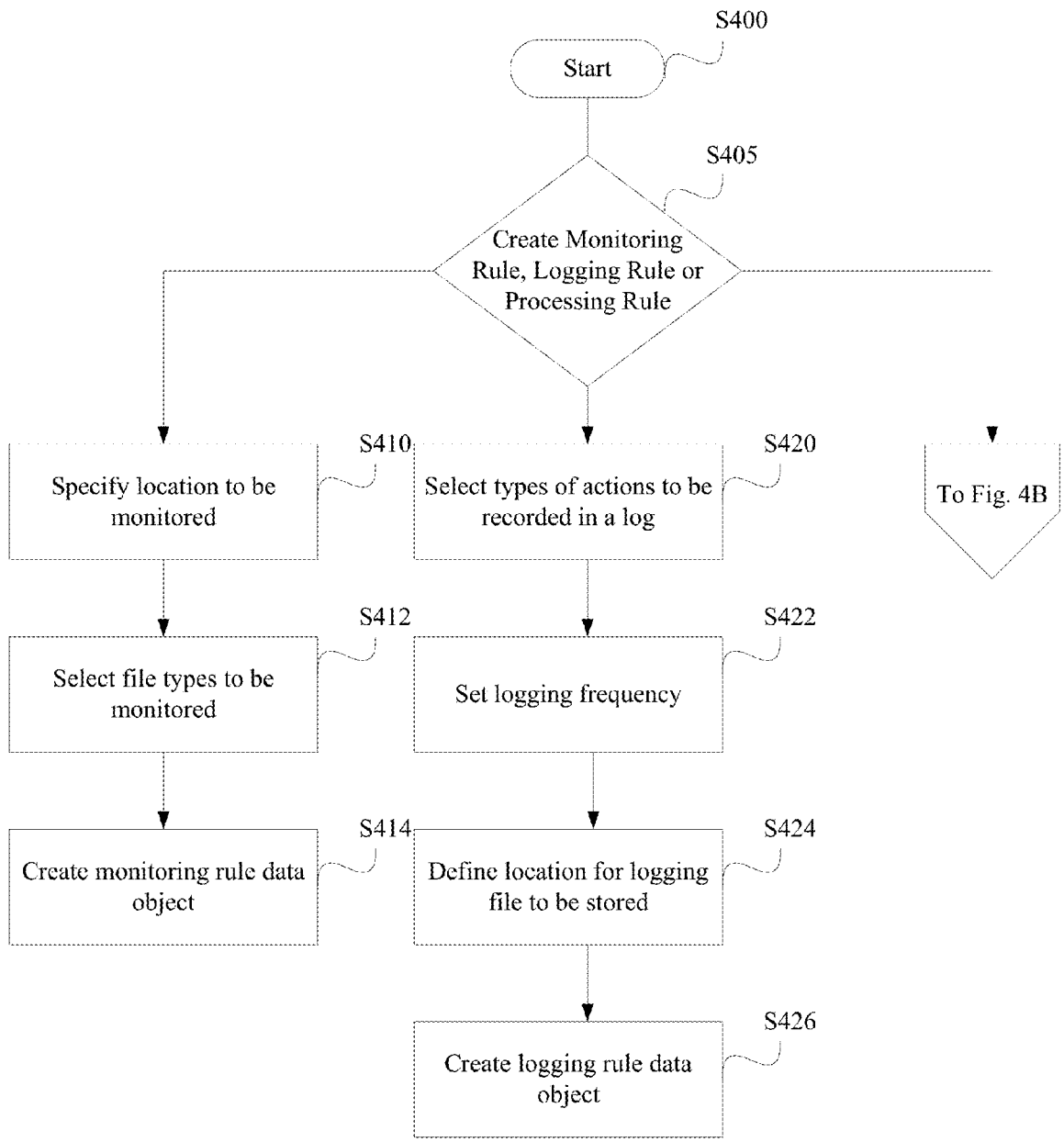
FIGS. 4A & 4B illustrate exemplary operational flows at computing system according to invention principles.
Figure 4B:
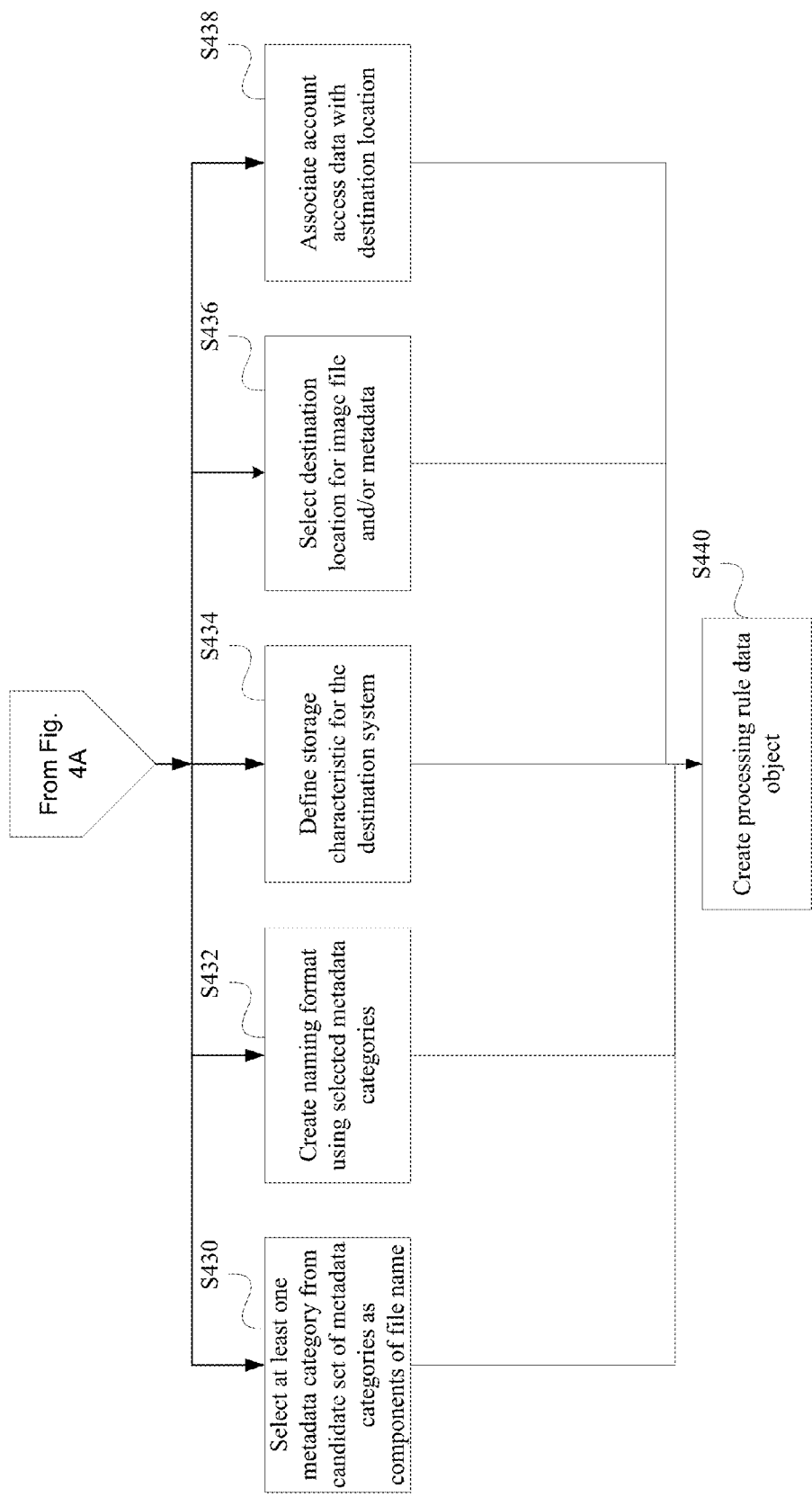

Once again referring back to step S405, upon determining that the rule creation routine is being used to create a processing rule which governs and controls how and where the application 111 may process one of the image files and/or metadata files associated with an image file, the flow continues to FIG. 4B which contains the algorithmic options available to users when creating processing rules. Each of the steps described hereinbelow with respect to FIG. 4B are shown in parallel with one another to denote that any or more of the steps may be performed at a given time prior to creating a processing rule data object including the user-specified processing rules in step S440. It should be understood that any of steps S430-S438 as will be described below may be performed individually or sequentially in order to create the rules executed by application 111 for processing the image files and/or metadata files associated with imaging files.

In step S430, the application 111 receives user data input via at least one image element presented for display by the application 111 that enables selection of at least one category of metadata from a candidate set of metadata categories as a component of a file name. While step S430 describes the process of selection, it should be understood that the image element may also enable receipt of data input whereby the data input is specified or otherwise defined by the user. Step S430 advantageously enables the application to receive data specifying particular type(s) of metadata that will be used in a renaming procedure implemented by the application 111. Once this aspect of the processing rule is created, the application advantageously and automatically identifies specific types of metadata that is associated with the at least one image file in order to modify the data representing the at least one image file by changing a filename thereof. In one embodiment, the types of metadata selectable as being a file name component may include at least one of (a) a source file name; (b) a destination location; (c) a category defining a characteristic associated with an image file; (d) a date and time the source file was created; (e) user information identifying a creator of the file; (f) user information identifying a user who receives the file via data transfer; and (g) information describing the file in any manner. These categories of metadata that may be used as file name components are described for purposes of example only and should not be construed as limiting.

In step S432, the application receives user data input via at least one image element that advantageously uses at least one type of metadata set forth by the user as a component of a filename to define a naming format for the modified file. For example, if the selected types of metadata include "user name" and "source file name", S432 enables receipt of instructions determining the placement of these types of metadata with respect to one another to define a file naming format such as "user name" followed by "source file name". Thus, if the metadata associated with "user name" is USER1 and the metadata associated with "source file name" is FILE1, the naming format rule here would result in the application 111 automatically modifying a particular file to be renamed "USER1FILE1.xxx" where .xxx represents a particular file extension. In other embodiments, application 111 may automatically add a delineator character such as an underscore or dash between the metadata components that are selected to form the file name.

In one embodiment, application 111 enables steps S430 and S432 to be performed sequentially such that a user specifies the metadata categories and then chooses the name format using the specified metadata categories in order to generate a processing rule data object in step S440. In another embodiment, application 111 performs steps S430 to select the metadata categories for use in a naming format which is predefined in application 111 for inclusion in the rule processing data object formed in step S440. In another embodiment, metadata categories may be predefined and application 111 performs step S432 to define the naming format and including the naming format specification in step S440 which creates the rule processing data object.

Steps S434-S438 enable the application to receive data input via image elements in a GUI to define rule relating to the storage and/or transmission of at least one image file and associated metadata file to a destination computing system. As used herein, destination computing system may include the computing system on which application 111 is executing or a remotely located computing system accessible via a network. A destination computing system may also include a dedicated storage device such as a flash drive or memory card. In step S434, application receives data input defining a storage characteristic associated with one of the image file and/or metadata file associated with an image file. A storage characteristic may include identifying whether or not a respective type of file is to be stored on a storage medium at a destination system. A storage characteristic may also direct storing of the metadata contained in a metadata file associated with at least one image file in a database. This may include an instruction to create a database for storing the metadata using configuration data contained in the configuration data object created in the algorithm presented above in FIG. 2. These examples of storage characteristics are merely exemplary and any instruction associated with storing one of the image files generated by an image processing device and metadata files associated with those image file (either generated by the image processing device or another computing system) may comprise the storage characteristic.

In step S436, the application 111 receives user data input via at least one image element that identifies a destination location on a computing network for one of the image file and/or associated metadata file. The destination may be, but are not limited to, any address format including but not limited to (a) user name; (b) IP address; (c) directory name; (d) email address; (e) other internet-based communication address; (f) server name; (g) host name; and (h) any other identifier identifying a location on a computing network. The destination location information received by application 111 enables the application 111 to automatically communicate and/or transfer at least one of the at least one image file and/or associated metadata to a desired location.

In step S438, the application 111 receives user data input via at least one image element that identifies access account data associated with a particular destination location that would be needed for transferring data to the destination location. Access account data may include a user name and/or password required to access the destination location. In other embodiments, the access account data may include a data object (e.g. token) that has access credential information. In other embodiments, the access account data may be an internet address where access credential data is stored.

In one embodiment, application 111 enables steps S434-S438 to be performed sequentially such that a user specifies at least one storage characteristic for the destination system, identifies the location and provides account access data to allow access to the location in order to generate a processing rule data object in step S440. In other embodiments, application enables any of steps S434, S436 and S438 to be performed individually or in combination with one another to generate processing rule data object in step S440.

Upon completion of any or all of steps S430-S438, application 111 uses the received input to generate a processing rule data object in step S440. The processing rule data object includes instructions accessible and useable by the application 111 when processing at least one of the image file and metadata file associated with the at least one image file.

Figure 5:
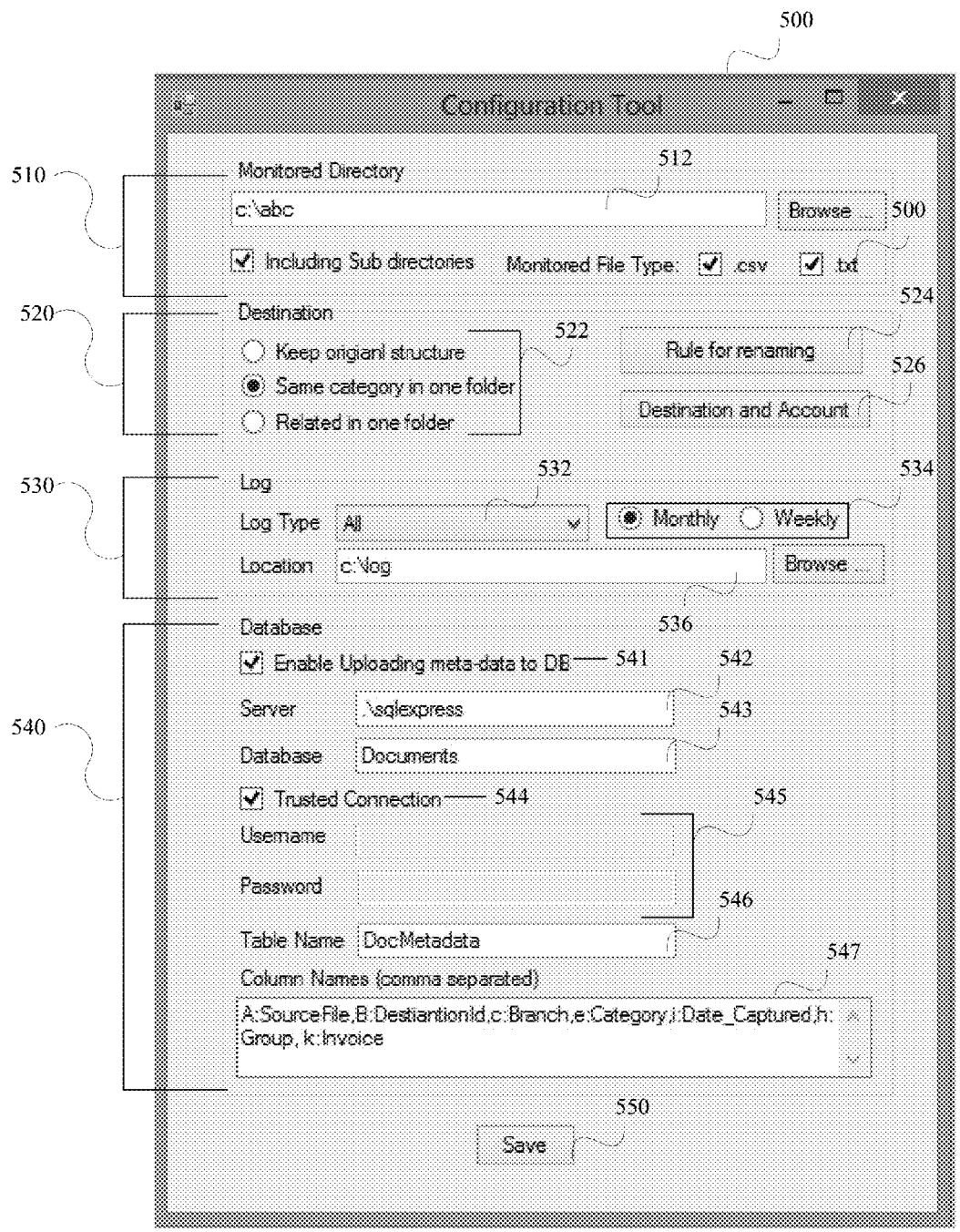
FIG. 5 illustrates an exemplary graphical user interface (GUI) generated for display on computing system according to invention principles.
Figures 6, 7:
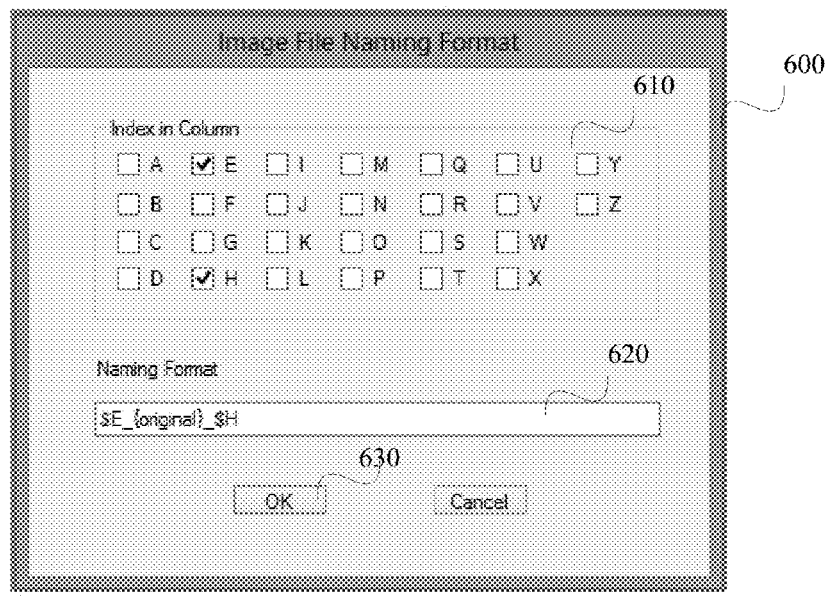
FIG. 6 illustrates an exemplary (GUI) generated for display on computing system according to invention principles.
FIG. 7 illustrates an exemplary (GUI) generated for display on computing system according to invention principles.

FIGS. 5-7 illustrate exemplary user interfaces including various types of image elements that enable receipt of information from a user in order to generate one of the configuration data object, monitoring data object, logging data object and/or processing data objects described hereinabove with respect to FIGS. 2-4.

FIG. 5 is an exemplary graphical user interface (GUI) 500 generated by application 111 executing on computing system 110. The GUI 500 represents a configuration user interface that enables receipt of input from a user to generate various data objects which are usable by the application 111 a various stages of execution and processing. Additionally, the configuration GUI 500 includes a plurality of different type of image elements that receive the input from the user and operate to either initiate further execution of a particular routine executed by application 111 or receive information that is used by the application as a type of input for a particular routine being executed by the application 111. These image elements include any of (a) free-form text fields that allow a user to enter alphanumeric characters therein; (b) check boxes that allow a user to select a particular option or feature; (c) action buttons that, in response to activation thereof, cause application 111 to execute a further routine (e.g. initiate display of further GUI's or initiate creation of a data object); and (d) drop-down menus enabling selection of an option from a set of candidate options. Thus, the following description of the various image elements as one of the above types of image elements should not be construed as limiting and the particular image element may be any type of image element either listed above or an image element that accomplishes the described operation.

The configuration interface 500 includes a monitoring region 510 that enables receipt of input from a user that is used in generating a monitoring data object as described in steps S410-S414 in FIG. 4A. The monitoring region 510 may include a directory entry image element 512 that receives data input from the user via at least type of input device (e.g. keyboard, mouse, touch screen, etc.) representing a directory on a computing system (either locally or on a remote computing device or server) to be monitored by application 111. In one embodiment, the directory image element is a free-form text entry element. In another embodiment, the directory element may be populated by selection of browse image element 513 that will generate display of a directory structure GUI that allow the user to select a desired location. The monitoring region 510 may also includes a sub-directory selection feature 515 which, if selected by the user, results in the created monitoring data object to also monitor any sub-directory contained in the directory specified in monitoring directory image element 512. The monitoring region 510 may also include at least one file type selection image element 516 that receives input identifying at least one type of file that the monitoring module will look for in the directory set forth in the directory image element 512. As shown herein, the file type selection image element enables selection of one or both of ".csv" file and/or a ".txt" file by selecting the check-box associated with the respective type of file. When directed to create the monitoring data object, the application 111 will identify the type of files having checks in their respective check-boxes as files to monitor. The monitoring data object created includes the various data inputs received by the fields in the monitoring region 510 and uses this information to identify the presence (or any changes to) the types of files (i.e. .csv and .txt files) in the directory (or any sub-directory) "c:/abc". In one embodiment, the monitoring data object may be generated by application in response to use selection of the save image element 550.

The configuration GUI 500 may also include a processing region 520 that receives input used by application 111 in generating the processing rule data object as discussed above in FIG. 4B. The processing region 520 may include at least one storage characteristic image element 522 enable receipt of input defining at least one storage characteristic included in the processing rule data object. For example, a user may be directed to select one of a plurality of options to be included in the processing rule data object. This may include one of (a) maintaining the files (i.e. the at least one image file and associated metadata file) in their original structure when transmitting the files to the destination account; (b) directing storage of the same category (type) of file in the same folder; or (c) directing storage of related files (e.g. files associated with the same transaction) in the same folder. The processing region 520 may also include renaming rule image element 524 that generates a further GUI enabling the application 111 to receive input from the user in defining a rule for renaming files as shown in FIG. 6 discussed below. The processing region 520 may also include a destination selection image element 526 that generates a further GUI enabling the application 111 to receive input from the user in defining destination data identifying a destination on a computing device that the files in the monitored directory are to be transmitted and account access data providing any account access data needed to access the specified destination. The GUI generated in response to selection of image element 526 is shown in FIG. 7 discussed below.

The configuration GUI 500 may also include a logging region that includes a plurality of image elements enabling receipt of input from a user for use in generating a logging data object as set forth in FIG. 4A. A logging action image element 532 may be included to allow for selection of the types of actions to be stored in a log file. As shown herein, the logging action image element 532 may be a dropdown box that presents a user with a selection of types of actions able to be logged. A frequency image element 534 allow for receipt of data specifying a frequency of generating the log file and a log location image element enables receipt of data specifying a location where any log file is to be stored.

The configuration GUI 500 may also include a configuration region 540 that includes a plurality of image elements that enable receipt of input from a user in generating a configuration data object as set forth in FIG. 3. A first element of the configuration data object is a control feature specifying whether or not metadata contained in a metadata file associated with at least one image file created by the image processing device is to be uploaded and stored in a database. A database creation image element 541 is represented as a checkbox such that, if a check mark is placed therein, the database creation element will be set to "yes" indicating that, a metadata database is to be created and that the created database should include at least one type of metadata stored in the metadata file. The database location image element 542 may be a text field image element able to receive alphanumeric input data from a user to identify a location where the database is to be created. This location may be an address of a local database or a location of a database on a remotely located server or computing device. A database name image element 543 may also be included to receive alphanumeric input from a user identifying one of a name of an existing database or a name of a newly created database created at the location specified in image element 542.

Database credential image elements 544 and 545 enable receipt of data from a user indicating information needed to allow the user to one of access a database or create a database. Trusted connection image element 544, if checked, indicates that the database indicated in element 543 at the location set forth in image element 542 one of (a) does not need any credential information to access or create; or (b) may use credential information previously provided by a user or stored by the computing system. A check mark in image element 544 may result in disabling user credential image elements 545. Should image element 544 remain unchecked, user credential data fields 545 will be active and allow a user to enter credential information (e.g. user name and password) to be included in the configuration data object created by application 111 and which allows for access and/or creation of the metadata database.

The configuration region 540 also contains various image elements enabling receipt of data from a user that specifies at least one parameter or property associated with the metadata database being created. A table name image element 546 may be a text field that receives alphanumeric data input from a user that represents a name of a table created in the database for storing the metadata from the metadata file. A database structure image element 547 receives data input from a user representing at least one type of metadata to that will be stored in the database. Each respective type of metadata represents a distinct column in the table of the database being created. The database structure image element 547 receives a first input representing a column in the database table and a second input representing a type of metadata that will be stored in the column of the table. Thus, as shown in FIG. 5, the structure of the metadata database is shown in Table 1 where the first row represents the column of the metadata database and the second row represents the type of metadata to be stored Additionally, the depiction of the configuration GUI 500 as a comprehensive GUI including image elements associated with creating multiple data objects is shown for purposes of example only and ease of explanation. It should be understood that each region as well as various elements in particular regions may be represented in different GUI's.

Referring now to FIG. 6, in response to selection of the renaming image element 524 in FIG. 5, application 111 causes naming GUI 600 to be generated. Naming GUI includes a naming element selection region 610 that includes a plurality image elements that correspond to at least one type of metadata that is associated with the at least one image file generated by image processing device 150. In the exemplary GUI shown in FIG. 6, the plurality of image elements are identified by alphanumeric characters A-Z where each character corresponds to a particular type of metadata associated with the image file. In one embodiment, the characters A-Z correspond to the types of metadata associated with respective columns of the metadata database as defined by the data input in database structure image element 547. In another embodiment, the characters A-Z correspond to predefined types of metadata understood by application 111. The inclusion of A-Z in the naming element selection region 610 is shown for purposes of example only. Any number (more or less) elements may be presented at a given time depending on the types of metadata defined in element 547 of FIG. 5 and/or the predetermined types of

TABLE 1

| Database Structure | | | | | | | |
|---|---|---|---|---|---|---|---|
| Column | A | B | D | E | I | H | K |
| Metadata Type | SourceFile | DestinationID | Branch | Category | Date_Captured | Group | Invoice |

The data representing the different type of metadata and respective column may be separated by separator character thereby allowing the application 111, when creating the configuration data object, to specifically identify and determine the location that the metadata is to be stored in the metadata database and the type of metadata to be stored at the particular location. Additionally, it should be noted that certain columns may be missing or not-specified for various reasons. For example, in one embodiment, a column C may be automatically created to include the destination address information and thus need not be individually configured by a user. The user can select the column in the metadata file that will be saved in the database table. For example, when a user wants to save column E of the metadata file to the database table column titled "Category", image element 547 receives data input from a user as follows: "E:Category". The order data input "Column:Name" received in image element 547 determines the order of the columns in the database table.

Each of the configuration data object, monitoring data object, logging data object and/or processing rule data object may be created from the input received via GUI 500 in response to selection of the save image element 550. The application advantageously creates various data objects based on the input data detected at a time when the save image element 550 is activated. Thus, if the configuration GUI 500 only includes data in the monitoring region and configuration region, application 111 only creates monitoring rule data object and configuration data object. Therefore, not all image elements need to be used at any given time.

metadata known by application 111. Once a particular image element from the group of image elements is selected, the metadata corresponding to the selected element will be included in the processing rule data object and used in renaming one of the image file and/or associated metadata file. T The naming GUI 600 also includes a naming format image element 620 that enable receipt of naming syntax data defining the naming format of any file being renamed. Data representing the selected name elements from region 610 are positioned in any order and, data representing the desired naming format is included in the processing rule data object and used by application 111 when processing the files. The naming syntax input into element 620 references the selected metadata type by inserting a character "$" before the selected element which instructs the application 111 to derive the value of that naming element from the column letter in the metadata database that follows "$". Also, data representing the original file name may also be included in the renamed file with the following syntax element "{original}". Thus, the example shown in FIG. 6 has metadata elements "E" and "H" selected as being file name elements and the naming syntax "$E_{original}_$H" indicates that renamed file will include the value of the metadata stored in column E followed by an underscore (_), followed by the original file name, followed by a second underscore (_) and ending with the value of the metadata stored in column H of the metadata database. A user can complete the naming rule data by activating the "ok" image element 630 which results in the application 111 using the data input in fields 610 and 620 to generate (or supplement) a processing rule data object.

Referring now to FIG. 7, in response to selection of the destination and account image element 526 in FIG. 5, a destination GUI 700 is generated by application 111. The destination GUI 700, the application 111 can receive, data input from users that provide destination and account data for accessing the destination. When the 'OK' button 710 is selected, destination and account info are encrypted and save to a file or a table in the database later. Saving to a file or table depends on whether users want to upload metadata to database as per the selection made in image element 541. When they do not want save metadata to database table and no database is created, destination and account info are saved to the configuration data object file. Otherwise, they are saved to a table in the database.

The application 111 advantageously uses the configuration data object, monitoring data object, logging data object and processing rule data objects created above to control the activities of the monitoring and processing modules of application 111. The monitoring and processing module activity will now be described with respect to FIG. 8. The modules are initiated in step S800. In step S802, the monitoring module parses the monitoring data object to identify the location to be monitored and engages in periodic monitoring of the location. In one embodiment, the location may be a directory on a computing device that is executing application 111 and that receives data generated by the image processing device 150. In step S805, the monitoring module determines whether an image file is present in the specified directory. In one embodiment, the monitoring module may be a window service, scheduled task, or regular executable. When started, the monitoring module reads configuration elements in the monitoring data object and watches the monitored directory by using, for example, Microsoft's 'FileSystemWatcher'. This determination may be made by the monitoring module identifying if any files are present in the directory and comparing file extensions of those files to the file extensions associated with the type of files to be monitored as defined in the monitoring data object created. In doing so, the file extension of any file in the monitored directory is compared, by the monitoring module, against known file extensions associated with image files (e.g. PDF, JPG, GIF, etc.) If no file extensions match in step S805, the monitoring module repeats so as to continually monitor the location for any changes in files therein. In one embodiment, monitoring activity as discussed in S805 may occurs after the expiration of a predetermined amount of time so as to conserve system resources and power.

In response to the determination in S805 indicating that image files are present at the monitored location, the monitoring module initiates a two-part query in step S806 to identify (a) whether at least one metadata file is also present at the monitored location and (b) if any metadata file present includes a sufficient amount of metadata values contained therein.

The determination in part (a) listed above may be made by the monitoring module identifying if any files are present in the directory and comparing file extensions of those files to the file extensions associated with the type of files to be monitored as defined in the monitoring data object created, in part, using file type image element 514. If the file extensions of the files in the directory do not match the file extensions contained in monitoring data object, the monitoring module determines that no metadata files are present. If the determination in part (a) of step S806 is positive indicating that file extensions of files in the monitored directory match the file extensions contained in monitoring data object, the monitoring module determines that metadata files are present. Thereafter, the determination in part (b) of S806 is computed to determine whether or not a sufficient amount of metadata is present within the metadata file stored in the monitored directory. The determination in part (b) of step S806 may be made by parsing the fields in the metadata file that store respective types of metadata. In doing so, the module identifies a particular type of metadata category that must have a value associated therewith. Thus, the module may parse the metadata file and compare the metadata categories in the columns of the metadata file to determine if at least one of the column labels corresponding to a type of metadata match a required metadata category. If this determination is positive, the module parses the field (e.g. row of the metadata file) corresponding to the metadata category to identify if the field includes a data value. In some embodiments, the module may also look to the actual value stored therein to ensure that the value complies with required value format. For example, if the required metadata category is "destination address", the module will parse the data value to identify (a) if there is a data value present and (b) if the value complies with certain formatting requirements (e.g. email address, server address, etc.).

The result of the determination in step S806 is negative (NO in 806) when the monitoring module identifies that one of two conditions has been satisfied. In a first condition, step S806 will result in a negative determination in response to the monitoring module determines that the result of the determination in part (a) of S806 is positive indicating that at least one file at the monitored location is a metadata file and the determination in part (b) is negative indicating that the metadata file does not include the required metadata therein. In a second condition, step S806 will result in a negative determination in response the monitoring module determining that the query in part (a) of S806 is negative indicating that no files present in the monitored directory are metadata files. In this second condition, the monitoring module may not proceed to make the determination in part (b) as an indication of no metadata files necessarily indicate that a sufficient amount of metadata is present. However, there may be some instances where the query of part (b) is undertaken to generate a negative result.

In response to a negative determination in step S806 (NO in S806), the application automatically initiates an editing module in step S808 which advantageously enables the user to edit the metadata file on which the comparison in step S806 was made. It should be noted that, step S808 is also initiated upon the determination in step S806 being negative which indicating that the monitored directory includes at least one image file but does not include a metadata file. In this instance, step S808 generates a graphical user interface of a metadata file template that receives data representing at least one type of metadata category and a value associated with the at least one type of metadata category. In some embodiments, the template metadata file generated in step S808 includes at least one pre-populated metadata category that is required to ensure that sufficient metadata is present at a given time prior to further processing.

Step S808 is an editing module that comprises a plurality of different activities shown in FIG. 9 and described below. The editing module results in generation of at least one editing GUI shown in FIGS. 10A and 10B that provide a graphical representation of the metadata file including the categories (i.e. types) of metadata present therein along with any associated data value. The editing GUI receives data input that one of adds, deletes or modifies either the type of metadata categories and/or the data values associated with the types of metadata categories.

Figure 8:
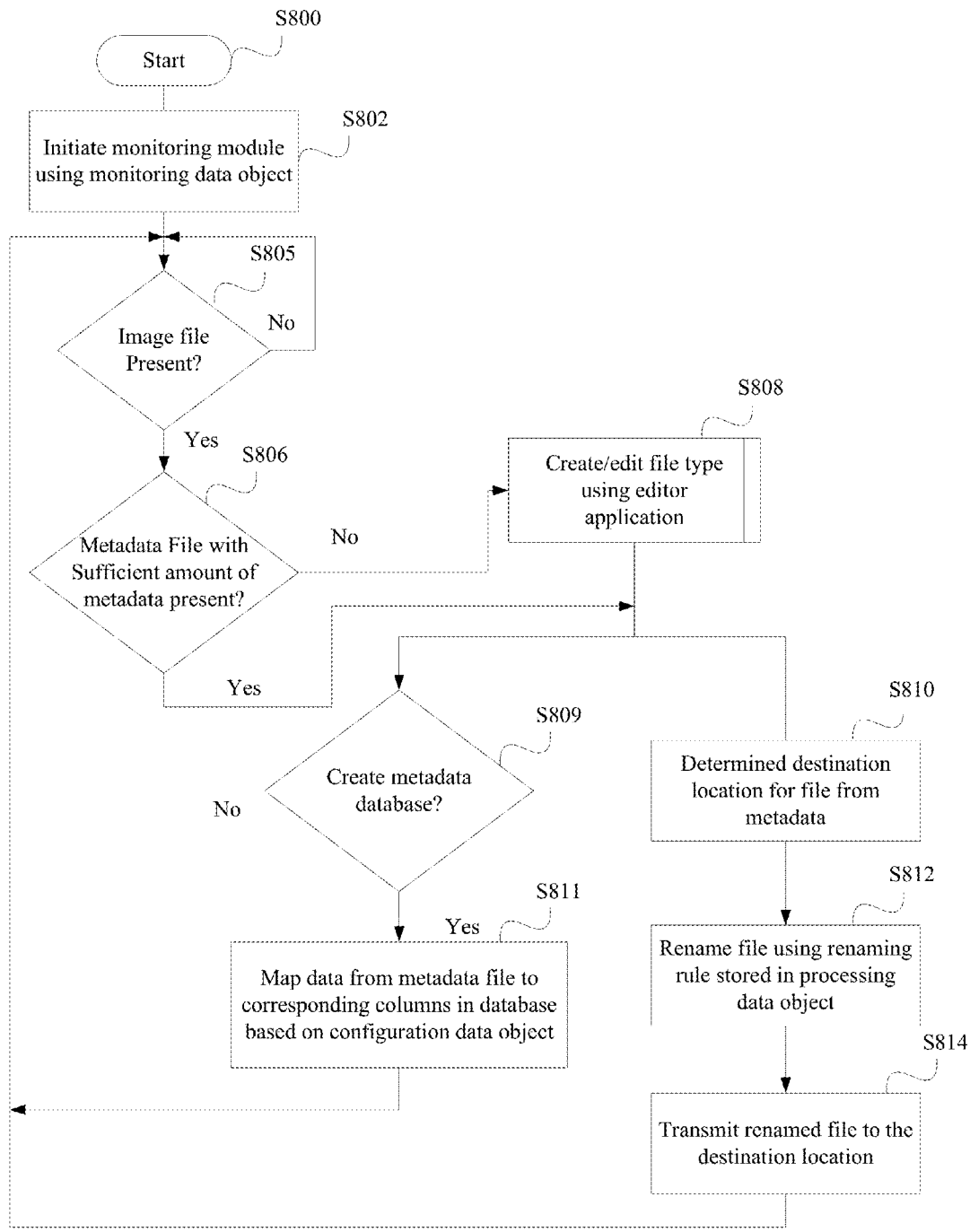
FIG. 8 illustrates an exemplary operational flow at computing system according to invention principles.
Figure 9:
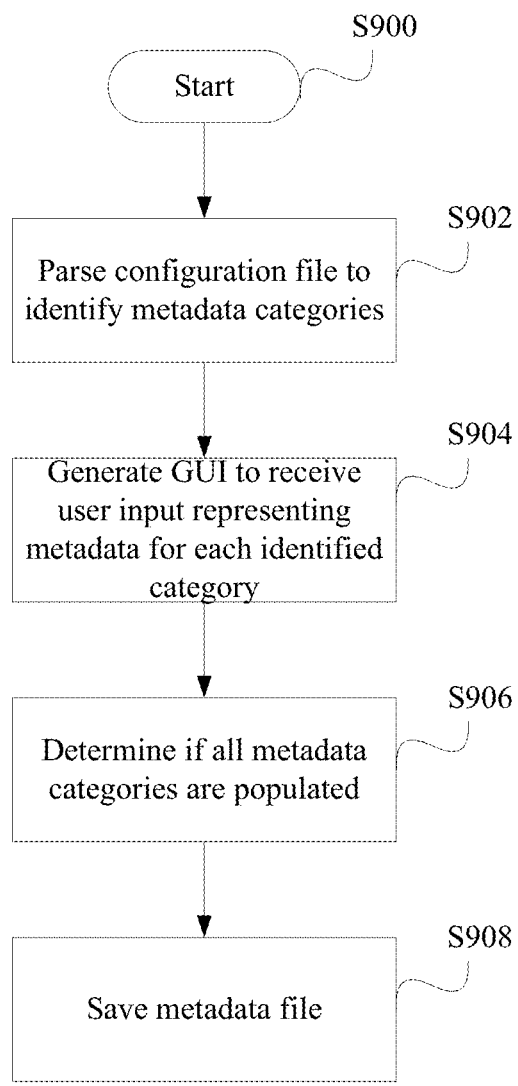
FIG. 9 illustrates an exemplary (GUI) generated for display on computing system according to invention principles.

Turning now to FIG. 9 which, in one embodiment, initiates at step S900 once step S808 in FIG. 8 has been called by the application 111. In step S902, the editing module parses the metadata file to identify the metadata categories and any associated data values present in the metadata file. The editing module uses the results of the parsing to as inputs to generate and display an editing GUI in step S904. Exemplary editing GUI's are shown in FIGS. 10A and 10B representing two use-cases executed by application 111 on how to deal with metadata.

Figures 10A, 10B:
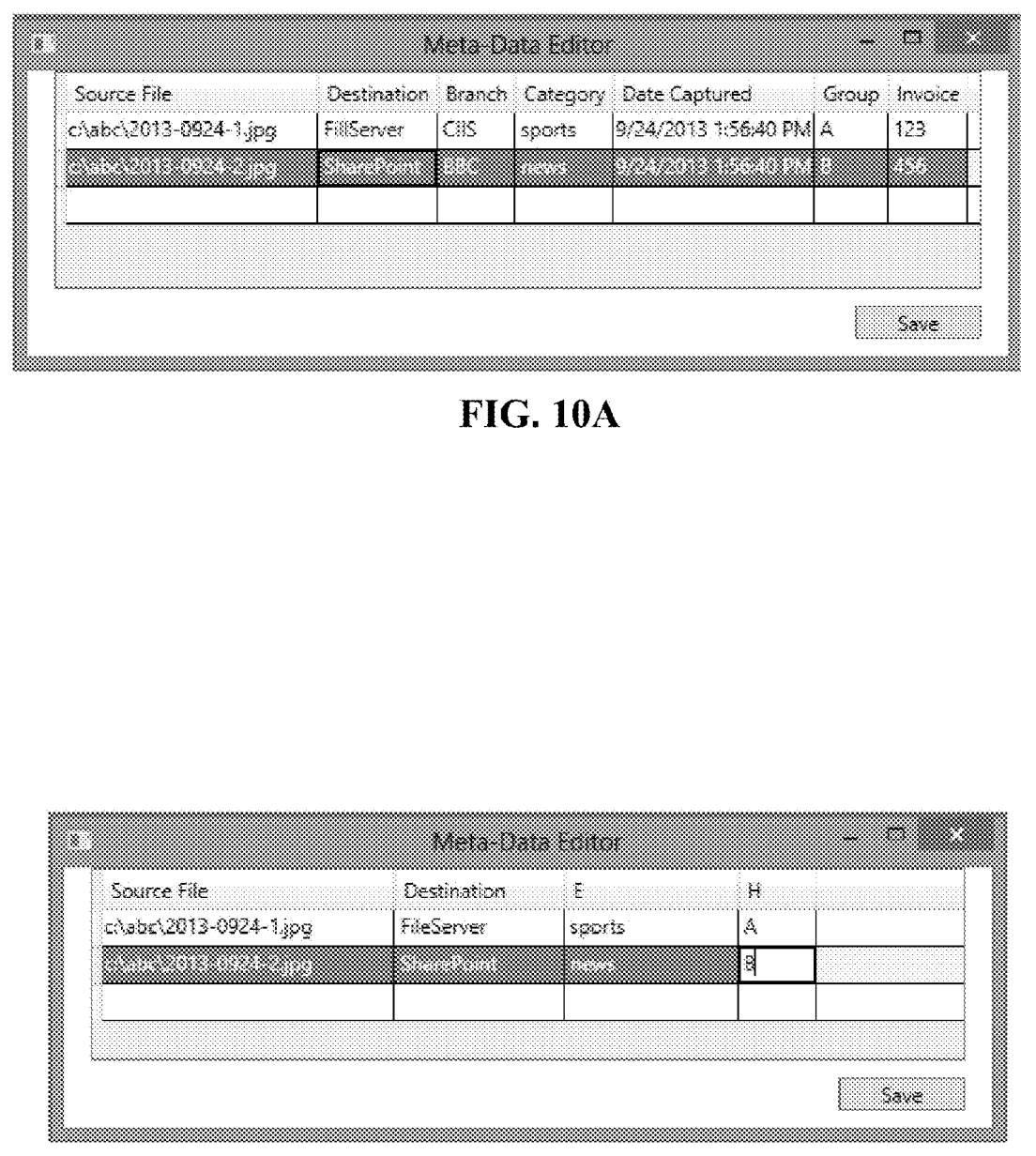

In FIG. 10A, a user may have specified in the configuration data object that metadata files associated with at least one image file generated by an image processing device is to be used to automatically create a database to store the associated metadata. In this embodiment, the editing GUI 1000 displays a plurality of column having heading names that correspond to the type of metadata to be stored in the database. The types of metadata can be derived from the configuration data object. The types of metadata may also be pre-populated depending on application configuration. In each row, data values corresponding to the types of metadata may be included. The data values may be pre-populated, for example, upon creation of the metadata file during generation of the at least one image file. Alternatively, a particular row may have no data value therein and the GUI in FIG. 10A enables the user to selectively add and/or modify a data value as needed.

In FIG. 10B, the GUI 1001a user may have specified in the configuration data object that metadata files associated with at least one image file generated by an image processing device is not to be used to automatically create a database to store the associated metadata and the monitoring data object identifies that a renaming rule (FIG. 6) has been selected requiring certain categories of metadata to be used as name elements in a naming syntax. Following the example shown in FIG. 6, the selected metadata categories are "E" and "H" so these category labels are displayed in GUI 1001 as column headings. The rows may or may not include data values depending on the result of the parsing in step S902. However, the GUI 1001 can receive input data from a user via the GUI 1001 to add/delete/modify data values for the various metadata categories.

The use cases shown and described in FIGS. 10A and 10B are provided for purposes of example only and the editing GUI generated by the editing module may include any number of metadata categories and associated data values.

Referring back to the description of FIG. 9, once the editing module of application 111 has received any data inputs and initiates a save operation, the editing module determines whether the required metadata categories include data values in step S906. For example, in FIG. 10A, the required metadata category may be "destination" and the editing module parses the updated metadata file to ensure that a data value is provided in the associated row for the column labeled "destination". In some embodiments, the editing module may automatically determine if any data value complies with a predetermined formatting requirement. In the example shown in FIG. 10B, the metadata required is set by the monitoring data object which includes a naming rule. Thus, the editing module, in this example, would determine if the metadata categories listed in the renaming rule, here "E" and "H", include data values. Once compliance with any configuration, monitoring or processing rules as determined by the information stored in the configuration data object, monitoring data object, and/or processing data object, the metadata file is saved in step S908 thereby completing the routine executed by the monitoring module.

Returning back to FIG. 8, at the completion of the editing/creation routine in step S808 or upon the determination in step S806 indicating that (a) a metadata file is present and (b) sufficient metadata is present in the metadata file, the processing routine is initiated whereby the image files and associated metadata files are processed by application 111. One exemplary processing routine is illustrated in steps S809 and S811 which represent the automatic creation of a database in accordance with the configuration data object. In step S809, a determination is made as to whether or not a user has selected the option of creating the metadata database. If the result of the determination in step S809 is positive (YES in S809), the processing routine maps metadata from the metadata file to corresponding columns in the database that were defined in the configuration data object in step S811. In one embodiment, the application 111 utilizes Microsoft Entity Framework Code first and Fluent API to map data values in metadata to columns in the database table being created while ignoring non-selected metadata values. If the result of the query in step S809 is negative (NO in S809), the routine reverts back to S805 the monitoring of the identified location for further image and/or metadata files. In another embodiment, upon completion of step S811, the algorithm may proceed to step S810, as will be discussed below, in order to execute the renaming rule.

In another exemplary processing routine illustrated by steps S810, S812 and S814, the processing module uses the processing rule data object to identify whether or not a renaming rule has been specified and control the transmission of the image files and/or metadata to a destination location. In step S810, the processing module parses the metadata file to identify the column labeled "destination" and derive a data value therefrom. In step S812, the processing module uses the processing rule data object to identify the renaming rule and rename the image file in accordance therewith. For example, in the embodiment shown in FIG. 10B where categories "E" and "H" are determined to be naming elements for a naming syntax such as that shown in FIG. 6, the processing module parses the metadata file to identify columns labeled "E" and "H" and derive the data values contained therein. Step S812 may also include using the naming syntax from FIG. 6 to take data values from the respective columns and selectively modify the file name of the image file to have those data values in the specified order. In the example described herein, the naming syntax as shown in FIG. 6 is "$E_{original}_$H". Thus, the image file located in the first row of FIG. 10B would automatically be renamed as "sports_2013-09-1_A.jpg" where "sports" is the data value in column E and "A" is the data value in column H in FIG. 10B. It should be noted that these examples merely illustrate the principles of the invention and should not be considered limiting in any manner. Thereafter, in step S814, the processing module calls the communication interface of the computing device to transmit the image files and/or metadata files to the destination location which was determined in step S810. Upon completion of the transmission, the process reverts back to monitoring the identified location for additional image and/or metadata files.

Figure 11:
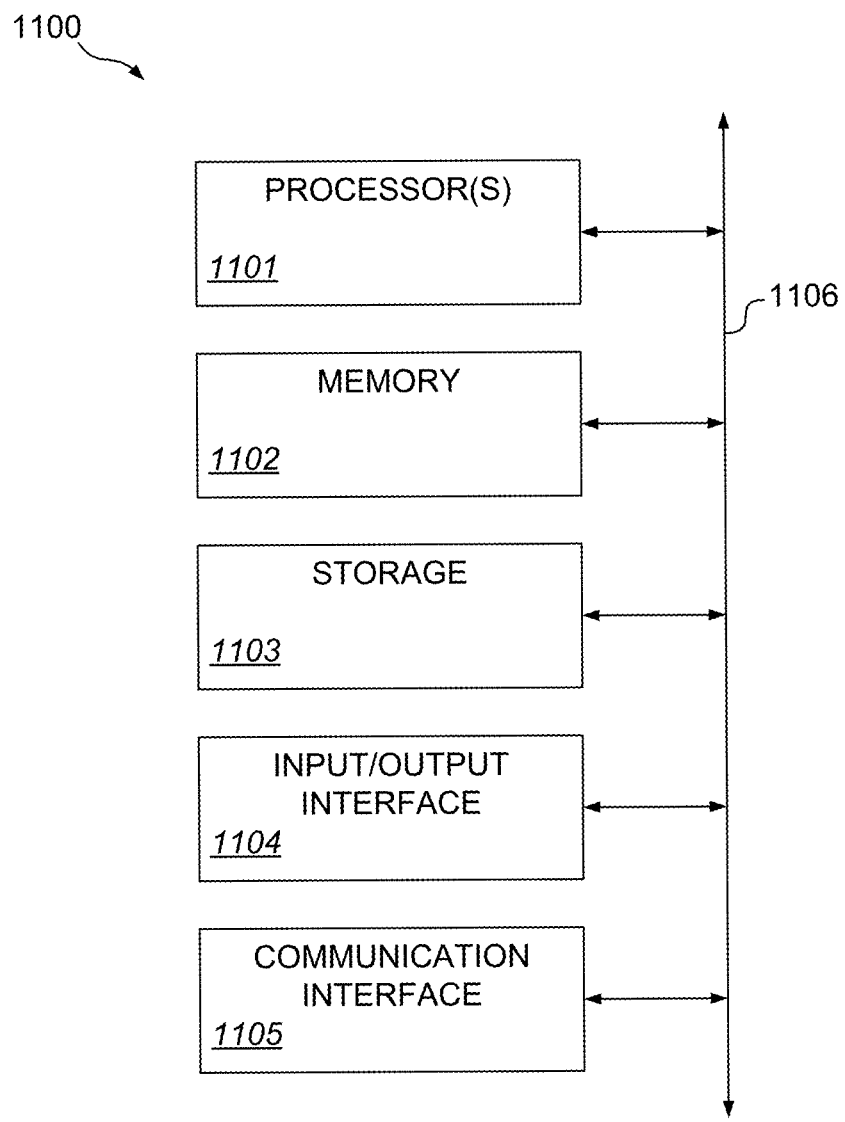
FIG. 11 illustrates an example computing system.

Turning now to FIG. 11 illustrates an example computing system 1100. According to various embodiments, all or a portion of the description of the computing system 1100 is applicable to all or a portion of one or more of the client computing system 110, the server computing system 130 and the server computing system 140.

The term computing system as used herein includes but is not limited to one or more software modules, one or more hardware modules, one or more firmware modules, or combinations thereof, that work together to perform operations on electronic data. The physical layout of the modules may vary. A computing system may include multiple computing devices coupled via a network. A computing system may include a single computing device where internal modules (such as a memory and processor) work together to perform operations on electronic data. Also, the term resource as used herein includes but is not limited to an object that can be processed at a computing system. A resource can be a portion of executable instructions or data.

In some embodiments, the computing system 1100 performs one or more steps of one or more methods described or illustrated herein. In some embodiments, the computing system 1100 provides functionality described or illustrated herein. In some embodiments, software running on the computing system 1100 performs one or more steps of one or more methods described or illustrated herein or provides functionality described or illustrated herein. Some embodiments include one or more portions of the computing system 1100.

The computing system 1100 includes one or more processor(s) 1101, memory 1102, storage 1103, an input/output (I/O) interface 1104, a communication interface 1105, and a bus 1106. The computing system 1100 may take any suitable physical form. For example, and not by way of limitation, the computing system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, PDA, a server, a tablet computer system, or a combination of two or more of these.

The processor(s) 1101 include hardware for executing instructions, such as those making up a computer program. The processor(s) 1101 may retrieve the instructions from the memory 1102, the storage 1103, an internal register, or an internal cache. The processor(s) 1101 then decode and execute the instructions. Then, the processor(s) 1101 write one or more results to the memory 1102, the storage 1103, the internal register, or the internal cache. The processor(s) 1101 may provide the processing capability to execute the operating system, programs, user and application interfaces, and any other functions of the computing system 1100.

The processor(s) 1101 may include a central processing unit (CPU), one or more general-purpose microprocessor(s), application-specific microprocessor(s), and/or special purpose microprocessor(s), or some combination of such processing components. The processor(s) 1101 may include one or more graphics processors, video processors, audio processors and/or related chip sets.

In some embodiments, the memory 1102 includes main memory for storing instructions for the processor(s) 1101 to execute or data for the processor(s) 1101 to operate on. By way of example, the computing system 1100 may load instructions from the storage 1103 or another source to the memory 1102. During or after execution of the instructions, the processor(s) 1101 may write one or more results (which may be intermediate or final results) to the memory 1102. One or more memory buses (which may each include an address bus and a data bus) may couple the processor(s) 1101 to the memory 1102. One or more memory management units (MMUs) may reside between the processor(s) 1101 and the memory 1102 and facilitate accesses to the memory 1102 requested by the processor(s) 1101. The memory 1102 may include one or more memories. The memory 1102 may be random access memory (RAM).

The storage 1103 stores data and/or instructions. As an example and not by way of limitation, the storage 1103 may include a hard disk drive, a floppy disk drive, flash memory, an optical disc, a magneto-optical disc, magnetic tape, or a Universal Serial Bus (USB) drive or a combination of two or more of these. In some embodiments, the storage 1103 is a removable medium. In some embodiments, the storage 1103 is a fixed medium. In some embodiments, the storage 1103 is internal to the computing system 1100. In some embodiments, the storage 1103 is external to the computing system 1100. In some embodiments, the storage 1103 is non-volatile, solid-state memory. In some embodiments, the storage 1103 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. The storage 1103 may include one or more memory devices. One or more program modules stored in the storage 1103 may be configured to cause various operations and processes described herein to be executed.

The I/O interface 1104 includes hardware, software, or both providing one or more interfaces for communication between the computing system 1100 and one or more I/O devices. The computing system 1100 may include one or more of these I/O devices, where appropriate. One or more of these I/O devices may enable communication between a person and the computing system 1100. As an example and not by way of limitation, an I/O device may include a keyboard, keypad, microphone, monitor, mouse, speaker, still camera, stylus, tablet, touch screen, trackball, video camera, another suitable I/O device or a combination of two or more of these. An I/O device may include one or more sensors. In some embodiments, the I/O interface 1104 includes one or more device or software drivers enabling the processor(s) 1101 to drive one or more of these I/O devices. The I/O interface 1104 may include one or more I/O interfaces.

The communication interface 1105 includes hardware, software, or both providing one or more interfaces for communication (such as, for example, packet-based communication) between the computing system 1100 and one or more other computing systems or one or more networks. As an example and not by way of limitation, the communication interface 1105 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network and any suitable communication interface 1105 for it. As an example and not by way of limitation, the computing system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing system 1100 may communicate with a wireless PAN (WPAN) (such as, for example, a Bluetooth WPAN or an ultra wideband (UWB) network), a WI-FI network, a WI-MAX network, a cellular telephone network (such as, for example, a Global System for Mobile Communications (GSM) network), or other suitable wireless network or a combination of two or more of these. The computing system 1100 may include any suitable communication interface 1105 for any of these networks, where appropriate. The communication interface 1105 may include one or more communication interfaces 1105.

The bus 1106 interconnects various components of the computing system 1100 thereby enabling the transmission of data and execution of various processes. The bus 1106 may include one or more types of bus structures including a memory bus or memory controller, a peripheral bus, and a local bus using any of a variety of bus architectures.

Figure 12:
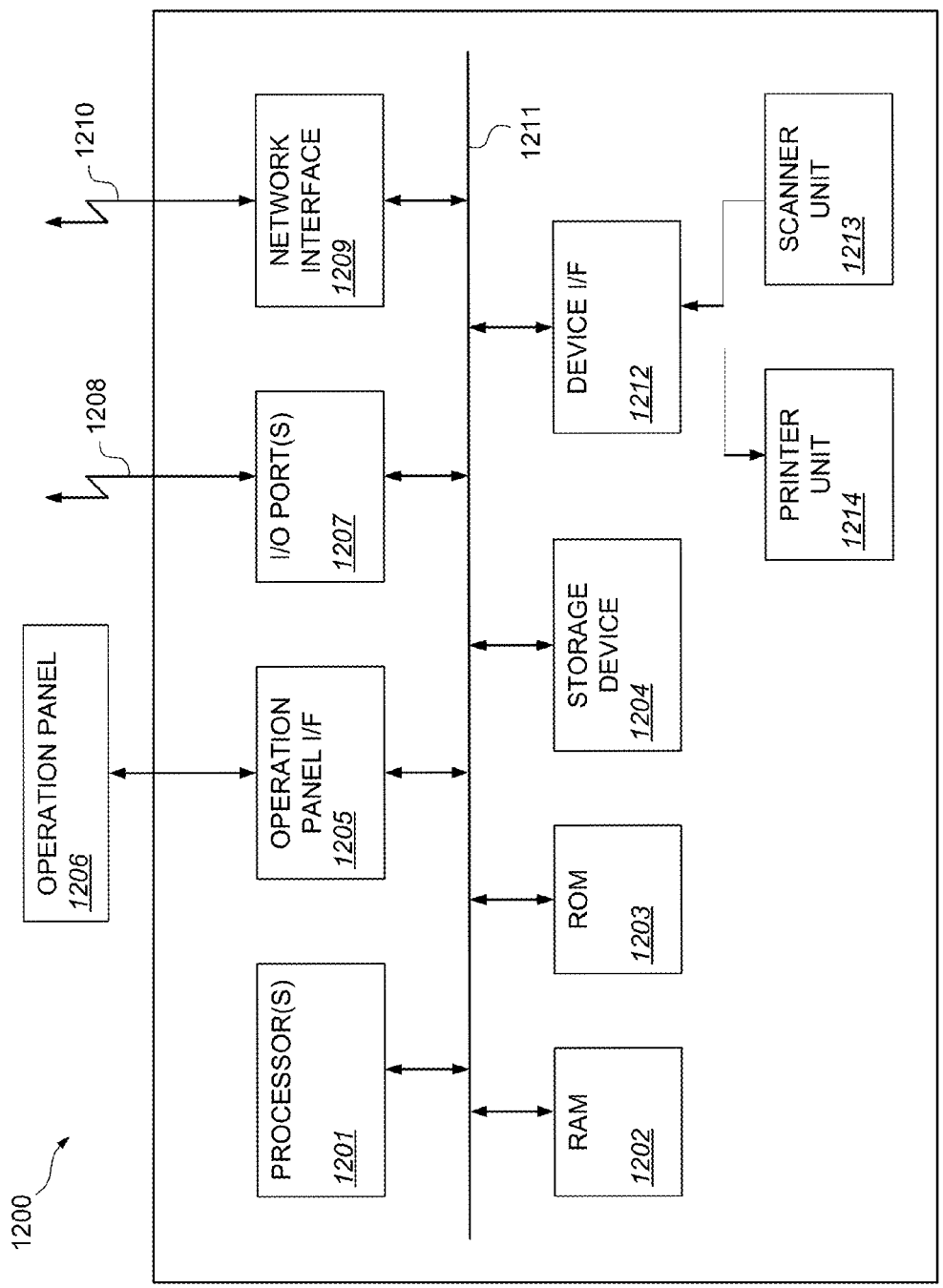
FIG. 12 illustrates an example image processing device.

FIG. 12 illustrates an example image processing device 1200. In some embodiments, the client computing system 101 of FIG. 1 comprises the image processing device 1200. The image processing device 1200 of FIG. 12 is a multi-function peripheral having a scanning function in addition to printing, copying and other functions. However, it will be understood that various other implementations of an image processing device are within the scope of the present invention. For example, various components, modules, functions, and/or configurations of the image processing device 1200 of FIG. 12 could be combined, deleted, or modified to form further implementations. Further by way of example, in some embodiments, other devices (for example, other devices having scanning capabilities) and/or computing systems (for example, a computer connected to a scanner) may be implemented as the image processing device 1200.

In some embodiments, the image processing device 1200 performs one or more operations described herein. In some embodiments, the image processing device 1200 provides functionality described herein. In some embodiments, software running on the image processing device 1200 performs one or more operations described herein.

The image processing device 1200 includes one or more processor(s) 1201. The processor(s) 1201 include a central processing unit (CPU) that performs overall control functions for the image processing device 1200. The CPU uses a random access memory (RAM) 1202 as a work area while executing instructions. The CPU executes instructions of various programs stored in one or more memory devices. For example, the CPU executes programs stored in a read only memory (ROM) 1203 and in a storage device 1204.

In some embodiments, the processor(s) 1201 include one or more processors in addition to the CPU. By way of example, the processor(s) 1201 may include one or more general-purpose microprocessor(s), application-specific microprocessor(s), and/or special purpose microprocessor(s). Additionally, in some embodiments the processor(s) 1201 may include one or more internal caches for data or instructions.

The processor(s) 1201 provide the processing capability required to execute an operating system, application programs, and various other functions provided on the image processing device 1200. The processor(s) 1201 perform or cause components of the image processing device 1200 to perform various operations and processes described herein, in accordance with instructions stored in one or more memory devices.

The RAM 1202 is used as a work area when the processor(s) 1201 execute various instructions, such as those making up computer programs stored in the ROM 1203 and/or the storage device 1204. The RAM 1202 may be used as a temporary storage area for various data, including input image data. The RAM 1202 may be used as a cache memory.

In some embodiments, the RAM may be dynamic RAM (DRAM) or static RAM (SRAM).

The ROM 1203 stores data and programs having computer-executable instructions for execution by the processor(s) 1201. In some embodiments, the ROM 1203 is a boot ROM, storing instructions for the booting process. In some embodiments, the ROM 1203 may be flash memory.

The storage device 1204 stores application data, program modules and other information. One or more program modules stored in the storage device 1204 are configured to cause various operations and processes described herein to be executed. For example, in some embodiments, the storage device 1204 stores instructions for generating and providing to a computing system a web page including an embedded executable program which, when executed on the computing system, is operable to obtain a ticket-granting ticket stored on the computing system and send the ticket-granting ticket to another computing system; determining whether a user associated with the ticket-granting ticket is authorized to access a protected resource comprising a web page; or a combination of these, in accordance with embodiments described herein. In some embodiments, the application 102 resides on the storage device 1204 and executes on the image processing device 1200.

The storage device 1204 also stores other programs and data to be processed. For example, the storage device 1204 stores an operating system including programs and data for managing hardware and software components of the image processing device 1200. Applications on the image processing device 1200 may utilize the operating system to perform various operations. The storage device 1204 may further store other programs and/or drivers that enable various functions of the image processing device 1200, graphical user interface (GUI) functions, and/or processor functions. The storage device 1204 may also store data files including, for example, image data, user data, configuration information, GUI components, such as graphical elements or templates, or other data required by the image processing device 1200.

In some embodiments, the image processing device 1200 may include other storage media. By way of example, and not by way of limitation, the storage media may include a floppy disk drive, flash memory, an optical disc, a magneto-optical disc, magnetic tape, or a Universal Serial Bus (USB) drive or a combination of two or more of these. Where appropriate, the storage media may include removable or fixed media. Where appropriate, the storage media may be internal or external to the image processing device 1200. In some embodiments, the storage media is non-volatile, solid-state memory. The storage media may take any suitable physical form. For example, the storage media may be in the form of one or more removable blocks, modules, or chips. The computer-readable storage medium need not be one physical memory device, but can include one or more separate memory devices.

An operation panel interface 1205 provides output signals to and receives input signals from an operation panel 1206. Regarding the output signals, the operation panel interface 1205 provides GUI data to the operation panel 1206 for display on a liquid crystal display (LCD). Regarding the input signals, the operation panel interface 1205 receives input signals based on user input operations at the operation panel 1206 and relays the input signals to the processor(s) 1201. In some embodiments, the operation panel 1206 includes a touch sensitive element operable to receive user input operations or commands based on the touching of graphical objects displayed on the LCD. In some embodiments, the operation panel 1206 includes a hard key panel.

The image processing device 1200 includes one or more input/output (I/O) port(s) 1207. The I/O port(s) 1207 may include any suitable interface type such as a universal serial bus (USB) port, FireWire port (IEEE-1394), serial port, parallel port, or AC/DC power connection port. The I/O port(s) 1207 enable one or more external device(s) 12012 to communicate with the image processing device 1200 when the external device(s) 1208 is/are connected to the I/O port(s) 1207. Examples of external devices 1208 include a near field communication (NFC) interface (for example, an NFC reader), a smart card reader, radio-frequency identification (RFID) reader, device for detecting biometric information, a keyboard, keypad, sensor(s), a combination of two or more of these, or other suitable device.

A network interface 1209 includes hardware, software, or both providing one or more interfaces for communication (such as, for example, packet-based communication) between the image processing device 1200 and one or more other computing systems or one or more networks 1210. As an example and not by way of limitation, the network interface 1209 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network 1210 and any suitable network interface 1209 for it. As an example and not by way of limitation, the image processing device 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks 1210 may be wired or wireless. As an example, the image processing device 1200 may communicate with a wireless PAN (WPAN) (such as, for example, a BLUETOOTH WPAN), a WI-FI network, a WI-MAX network, or other suitable wireless network or a combination of two or more of these. The image processing device 1200 may include any suitable network interface 1209 for any of these networks 1210, where appropriate.

A system bus 1211 interconnects various components of the image processing device 1200 thereby enabling the transmission of data and execution of various processes. The system bus 1211 may include one or more types of bus structures including a memory bus or memory controller, a peripheral bus, and a local bus using any of a variety of bus architectures.

The device interface 1212 is connected to the scanner unit 1213 and to the printer unit 1214. The device interface 1212 performs synchronous/asynchronous conversion of image data.

The scanner unit 1213 includes a light source and an image sensor. The scanner unit 1213 may include a glass platen and/or an automatic document feeder (ADF). In operation, the light source illuminates a physical document positioned on the glass platen or fed by the ADF. Light reflected by the physical document reaches the image sensor, and the image sensor converts the light into electrical signals. In some embodiments, the scanner unit 1213 includes an optical system (for example, mirrors, lens) that directs the light to the image sensor. After the image sensor generates the electrical signals, an analog-to-digital converter converts the electrical signals to digital image data representing the scanned physical document. The scanner unit 1213 then outputs the digital image data to one or more other components of the image processing device 1200 via the device interface 1212.

The printer unit 1214 is an image output device for printing on a sheet an image corresponding to image data. In response to a print command received at the image processing device 1200, the printer unit 1214 receives image data via the device interface 1212 and outputs to a sheet an image corresponding to the image data.

Various above-described operations performed by the client computing systems 110 and/or 120, the server computing system 130 and/or 140, may be executed and/or controlled by one or more applications running on these system, respectively. The above description serves to explain principles of the invention; but the invention should not be limited to the examples described above. For example, the order and/or timing of some of the various operations may vary from the examples given above without departing from the scope of the invention. Further by way of example, the type of network and/or computing systems may vary from the examples given above without departing from the scope of the invention. Other variations from the above-recited examples may also exist without departing from the scope of the invention.

The scope of the present invention includes a non-transitory computer-readable medium storing instructions that, when executed by one or more processors, cause the one or more processors to perform one or more embodiments of the invention described herein. Examples of a computer-readable medium include a hard disk, a floppy disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

While the present invention has been described with reference to exemplary embodiments, it is to be understood that the invention is not limited to the disclosed exemplary embodiments.

I claim:
1. A method comprising:
generating, at a computing system, a graphical user interface including a plurality of user selectable image elements enabling receipt of user data inputs that are used in creating configuration data object including
structure data that creates a table in database that stores metadata associated with an image file, the structure data defining a format for the table including at least one type of metadata to be stored therein;
monitoring data identifying a location on a data store to be monitored; and
destination data identifying a location that the at least one type of file is to be transmitted;
monitoring, using the monitoring data of the configuration data object, the identified monitoring location to detect a presence of at least one image file received from an image processing device;
detecting, at the monitoring location, a presence of a metadata file associated with the at least one image file and determining if a sufficient amount of metadata is included in the metadata file; and
in response to detecting a sufficient amount of metadata is included in the metadata file, automatically transmitting the at least one image file and metadata file to the destination location identified in the destination data, and creating a table in a database based on the structure data to map respective types of metadata to respective columns in the table and parsing the metadata file to map metadata values associated with respective types of metadata to corresponding respective columns in the table, and storing the at least one type of metadata therein; and in response to detecting that an insufficient amount of metadata is included in the metadata file, automatically generating a graphical user interface for receiving data inputs from a user enabling a user to modify a value of at least one type of metadata identified as being insufficient and updating the modified metadata file based on data inputs received from the user;

transmitting the at least one image file and metadata file to the destination location identified in the destination data, and creating a table in a database based on the structure data to map respective types of metadata to respective columns in the table and parsing the metadata file to map metadata values associated with respective types of metadata to corresponding respective columns in the table, and storing the at least one type of metadata therein.

2. The method of claim 1, further comprising in response to detecting that the monitoring location only includes at least one image file, automatically generating a graphical user interface for receiving data inputs from a user representing the at least one type of metadata included in the structure data of the configuration data object;

creating a metadata file based on the received data inputs and associating the created metadata file with the at least one image file;

transmitting the at least one image file and metadata file to the destination location identified in the destination data, and creating a table in a database based on the structure data and storing the at least one type of metadata therein.

3. The method of claim 2, wherein the activity of generating a graphical user interface includes parsing a configuration data object to identify at least one type of metadata required to transmit the at least one image file and metadata file to the destination location; and generating at least one field for receiving data inputs from the user via the graphical user interface representative of the required at least one type of metadata.

4. The method of claim 1, wherein the configuration data object identifies at least one type of metadata as a required metadata, and the activity of determining if a sufficient amount of metadata further includes parsing the configuration data object to derive the required at least one type of metadata;

parsing the metadata file to identify metadata categories included therein;

comparing metadata categories of the metadata file with the derived required type of metadata; and providing a notification that sufficient metadata is present when at least one of the metadata categories matches the derived required type of metadata.

5. The method of claim 1, wherein the activity of generating a configuration data object further includes receiving user data inputs to generate renaming data for inclusion in the configuration data object, the renaming data specifying respective types of metadata used to rename the at least one image file and a file name format defining a position of the respective types of metadata; and further comprising automatically renaming a file name of the at least one image file using the file name format and specified respective types of metadata including in the renaming data of the configuration data object when the metadata file is determined to include the respective types of metadata therein.

6. The method of claim 5, wherein in response to determining that the metadata file does not include at least one of the respective types of metadata specified in the renaming data, generating a graphical user interface for receiving data inputs from a user enabling a user to modify the metadata file to include the respective type of metadata; and rename the at least one image file in accordance with the file name format and including the respective types of metadata.

7. A server comprising:

one or more processors; and a memory coupled to the one or more processors, the memory storing instructions that, when executed by the one or more processors, cause the one or more processors to generate a graphical user interface including a plurality of user selectable image elements enabling receipt of user data inputs that are used in creating configuration data object including structure data that creates a table in database that stores metadata associated with an image file, the structure data defining a format for the table including at least one type of metadata to be stored therein;

monitoring data identifying a location on a data store to be monitored; and destination data identifying a location that the at least one type of file is to be transmitted;

monitor, using the monitoring data of the configuration data object, the identified monitoring location to detect a presence of at least one image file received from an image processing device;

detect, at the monitoring location, a presence of a metadata file associated with the at least one image file and determining if a sufficient amount of metadata is included in the metadata file; and in response to detecting a sufficient amount of metadata is included in the metadata file, automatically transmits the at least one image file and metadata file to the destination location identified in the destination data, and creates a table in a database based on the structure data to map respective types of metadata to respective columns in the table and parsing the metadata file to map metadata values associated with respective types of metadata to corresponding respective columns in the table, and storing the at least one type of metadata therein; and in response to detecting that an insufficient amount of metadata is included in the metadata file, automatically generate a graphical user interface for receiving data inputs from a user enabling a user to modify a value of at least one type of metadata identified as being insufficient and updating the modified metadata file based on data inputs received from the user;

transmit the at least one image file and metadata file to the destination location identified in the destination data, and create a table in a database based on the structure data to map respective types of metadata to respective columns in the table and parsing the metadata file to map metadata values associated with respective types of metadata to corresponding respective columns in the table, and storing the at least one type of metadata therein.

8. The server of claim 7, wherein the one or more processors in response to detecting that the monitoring location only includes at least one image file, automatically generate a graphical user interface for receiving data inputs from a user representing the at least one type of metadata included in the structure data of the configuration data object;

create a metadata file based on the received data inputs and associating the created metadata file with the at least one image file;

transmit the at least one image file and metadata file to the destination location identified in the destination data, and create a table in a database based on the structure data and storing the at least one type of metadata therein.

9. The server of claim 8, wherein the instructions cause the one or more processors parse a configuration data object to identify at least one type of metadata required to transmit the at least one image file and metadata file to the destination location; and generate at least one field for receiving data inputs from the user via the graphical user interface representative of the required at least one type of metadata and generate the graphical user interface by embedding the at least one field therein.

10. The server of claim 7, wherein the configuration data object identifies at least one type of metadata as a required metadata, and the instructions cause the one or more processors to determining if a sufficient amount of metadata by parsing the configuration data object to derive the required at least one type of metadata;

parsing the metadata file to identify metadata categories included therein;

comparing metadata categories of the metadata file with the derived required type of metadata; and providing a notification that sufficient metadata is present when at least one of the metadata categories matches the derived required type of metadata.

11. The server of claim 7, wherein the instructions cause the one or more processors to generate renaming data for inclusion in the configuration data object, the renaming data specifying respective types of metadata used to rename the at least one image file and a file name format defining a position of the respective types of metadata; and automatically rename a file name of the at least one image file using the file name format and specified respective types of metadata including in the renaming data of the configuration data object when the metadata file is determined to include the respective types of metadata therein.

12. The server of claim 11, wherein the instructions cause the one or more processors to in response to determining that the metadata file does not include at least one of the respective types of metadata specified in the renaming data, generate a graphical user interface for receiving data inputs from a user enabling a user to modify the metadata file to include the respective type of metadata; and rename the at least one image file in accordance with the file name format and including the respective types of metadata.

13. The server of claim 7, wherein the instructions cause the one or more processors to create the table in a database further includes using the structure data to map respective types of metadata to respective columns in the table and parse the metadata file to map metadata values associated with respective types of metadata to corresponding respective columns in the table.

14. A non-transitory computer-readable medium storing instructions that, when executed by one or more processors, cause the one or more processors to perform operations comprising:

generating, at a computing system, a graphical user interface including a plurality of user selectable image elements enabling receipt of user data inputs that are used in creating configuration data object including structure data that creates a table in database that stores metadata associated with an image file, the structure data defining a format for the table including at least one type of metadata to be stored therein;

monitoring data identifying a location on a data store to be monitored; and destination data identifying a location that the at least one type of file is to be transmitted;

monitoring, using the monitoring data of the configuration data object, the identified monitoring location to detect a presence of at least one image file received from an image processing device;

detecting, at the monitoring location, a presence of a metadata file associated with the at least one image file and determining if a sufficient amount of metadata is included in the metadata file; and in response to detecting a sufficient amount of metadata is included in the metadata file, automatically transmitting the at least one image file and metadata file to the destination location identified in the destination data, and creating a table in a database based on the structure data to map respective types of metadata to respective columns in the table and parsing the metadata file to map metadata values associated with respective types of metadata to corresponding respective columns in the table, and storing the at least one type of metadata therein; and in response to detecting that an insufficient amount of metadata is included in the metadata file, automatically generating a graphical user interface for receiving data inputs from a user enabling a user to modify a value of at least one type of metadata identified as being insufficient and updating the modified metadata file based on data inputs received from the user;

transmitting the at least one image file and metadata file to the destination location identified in the destination data, and creating a table in a database based on the structure data to map respective types of metadata to respective columns in the table and parsing the metadata file to map metadata values associated with respective types of metadata to corresponding respective columns in the table, and storing the at least one type of metadata therein.

15. The non-transitory storage medium of claim 14, further comprising
in response to detecting that the monitoring location only includes at least one image file, automatically
generating a graphical user interface for receiving data inputs from a user representing the at least one type of metadata included in the structure data of the configuration data object;
creating a metadata file based on the received data inputs and associating the created metadata file with the at least one image file;
transmitting the at least one image file and metadata file to the destination location identified in the destination data, and
creating a table in a database based on the structure data and storing the at least one type of metadata therein.

16. The non-transitory storage medium of claim 15, further comprising
parsing a configuration data object to identify at least one type of metadata required to transmit the at least one image file and metadata file to the destination location; and
generating at least one field for receiving data inputs from the user via the graphical user interface representative of the required at least one type of metadata.

17. The non-transitory storage medium of claim 14, further comprises
generating a configuration data object further by receiving user data inputs at a graphical user interface to generate renaming data for inclusion in the configuration data object, the renaming data specifying respective types of metadata used to rename the at least one image file and a file name format defining a position of the respective types of metadata; and
automatically renaming a file name of the at least one image file using the file name format and specified respective types of metadata including in the renaming data of the configuration data object when the metadata file is determined to include the respective types of metadata therein.

18. The non-transitory storage medium of claim 17, wherein
in response to determining that the metadata file does not include at least one of the respective types of metadata specified in the renaming data, generating a graphical user interface for receiving data inputs from a user enabling a user to modify the metadata file to include the respective type of metadata; and
rename the at least one image file in accordance with the file name format and including the respective types of metadata.

* * * * *